United States Patent
Fowell et al.

(10) Patent No.: US 7,260,456 B2
(45) Date of Patent: Aug. 21, 2007

(54) PIXEL-FREQUENCY SLEWS AND FILTERS FOR STAR DATA MEASUREMENTS

(75) Inventors: Richard A. Fowell, Rolling Hills Estates, CA (US); Yeong-Wei A. Wu, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 218 days.

(21) Appl. No.: 11/064,375

(22) Filed: Feb. 23, 2005

(65) Prior Publication Data

US 2007/0150128 A1      Jun. 28, 2007

Related U.S. Application Data

(63) Continuation-in-part of application No. 11/029,264, filed on Jan. 5, 2005.

(60) Provisional application No. 60/534,221, filed on Jan. 5, 2004.

(51) Int. Cl.
*B64G 1/36* (2006.01)
*B64G 1/24* (2006.01)

(52) U.S. Cl. .............................. 701/13; 244/164; 701/4

(58) Field of Classification Search ................ 701/222, 701/226, 13, 4, 224; 244/164, 171, 171.2, 244/17.13, 184; 73/1.79
See application file for complete search history.

(56) References Cited

U.S. PATENT DOCUMENTS

| | | | |
|---|---|---|---|
| 3,513,318 A | | 5/1970 | Birnbaum et al. |
| 4,688,091 A | | 8/1987 | Kamel et al. |
| 4,825,055 A | * | 4/1989 | Pollock ...................... 235/411 |
| 5,319,969 A | * | 6/1994 | Billing-Ross et al. ..... 73/178 R |
| 5,960,097 A | * | 9/1999 | Pfeiffer et al. .............. 382/103 |
| 5,984,237 A | * | 11/1999 | Goodzeit .................... 244/169 |
| 6,032,903 A | | 3/2000 | Fowell et al. |
| 6,098,929 A | | 8/2000 | Falbel |
| 6,158,694 A | | 12/2000 | Gowrinathan |
| 6,184,825 B1 | | 2/2001 | Wehner et al. |
| 6,566,640 B2 | | 5/2003 | Wu et al. |

* cited by examiner

*Primary Examiner*—Dalena Tran
(74) *Attorney, Agent, or Firm*—Gates & Cooper LLP

(57) ABSTRACT

A method and apparatus for reducing centroiding error of a star sensor having a plurality of pixels is disclosed. The method comprises the steps of computing a star sensor angular slew rate of ω pixels per star sensor integration period τ, collecting star sensor data while slewing the star sensor according to the selected star sensor angular slew rate ω, and filtering the collected star sensor data according to a frequency determined by the selected star sensor angular slew rate.

63 Claims, 15 Drawing Sheets

PIXEL-FREQUENCY SLEWS AND FILTERS FOR STAR DATA MEASUREMENTS

CROSS-REFERENCE TO RELATED APPLICATIONS

This application is a continuation-in-part of U.S. patent application No. 11/029,264, entitled "PIXEL-FREQUENCY SLEWS AND FILTERS FOR STAR DATA MEASUREMENTS," by Richard A. Fowell and Yeong-Wei A. Wu, filed Jan. 5, 2005, which application claims benefit of U.S. Provisional patent application No. 60/534,221, entitled "PIXEL-FREQUENCY SLEWS AND FILTERS FOR STAR DATA MEASUREMENTS," by Richard A. Fowell and Yeong-Wei A. Wu, filed Jan. 5, 2004, both of which applications are hereby incorporated by reference herein.

STATEMENT OF RIGHTS OWNED

This invention was made with Government support under contract. The Government has certain rights in this invention.

BACKGROUND OF THE INVENTION

1. Field of the Invention

This invention relates generally to spacecraft attitude determination and control systems, more particularly, to a method and apparatus for correcting star tracker high spatial frequency (HSP) error to improve attitude determination performance in stellar inertial attitude determination systems.

2. Description of the Related Art

Satellite communication systems typically include an attitude determination and control system. In such systems, the spacecraft inertial attitude is determined continuously in the spacecraft control processor (SCP) by numerically propagating the measured spacecraft inertial rates provided by three orthogonal gyros. Periodically, star data (star positions, star magnitudes, and their time tags) provided by the star trackers are then used to correct the attitude errors caused by gyro bias and gyro angle random walk during attitude propagation. The resulting attitude determination performance depends heavily on star tracker performance in terms of its measured star position accuracy.

Star trackers measure the positions of stars in the star tracker field-of-view (FOV). Several types of errors typically corrupt star tracker position measurements, thereby resulting in attitude determination errors. These star tracker errors can be generally attributed to temporal noise (that changes over time), high spatial frequency error that changes rapidly as stars move across the FOV, and low spatial frequency (LSF) error that changes slowly as stars move across the FOV.

What is needed is a system and method for reducing spatial errors that degrade attitude determination and control systems. The present invention satisfies that need by post-processing the star data so that systematic HSF error can be removed without a need for real time control of star tracker boresight orientation.

SUMMARY OF THE INVENTION

To address the requirements described above, the present invention discloses a method and apparatus for reducing centroiding error of a star sensor having a plurality of pixels. In an embodiment that does not require filtering collected star sensor data, the method comprises the steps of computing a star sensor angular slew rate of ω pixels per star sensor integration period τ as $$\omega = \frac{n}{\tau},$$

wherein n is a positive integer; and collecting star sensor data while slewing the star sensor according to the selected star sensor angular slew rate ω. This invention can also be embodied in a processor; and a memory, in communication with the processor, the memory storing processor instructions. The processor instructions compute a star sensor angular slew rate of ω pixels rate star sensor integration period τ as $$\omega = \frac{n}{\tau},$$

wherein n is a positive integer, and collect star sensor data while slewing the star sensor according to the selected star sensor angular slew rate ω.

In another embodiment that provides more flexibility in the slew rate, integration time, and other parameters, but may require filtering, the method comprises the steps of computing a star sensor angular slew rate of ω pixels per star sensor integration period τ as $$\omega = \frac{n}{p\tau},$$

wherein n and p are positive integers and $p \geq 2$ and collecting star sensor data while slewing the star sensor according to the selected star sensor angular slew rate ω. This invention can also be embodied in a processor and a memory, in communication with the processor, the memory storing processor instructions comprising instructions, in which the instructions compute a star sensor angular slew rate of ω pixels per star sensor integration period τ as $$\omega = \frac{n}{p\tau},$$

wherein n and p are positive integers and $p \geq 2$ and collect star sensor data while slewing the star sensor according to the selected star sensor angular slew rate ω.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be used and structural changes may be made without departing from the scope of the present invention.

Attitude Control Systems

Figure 1:
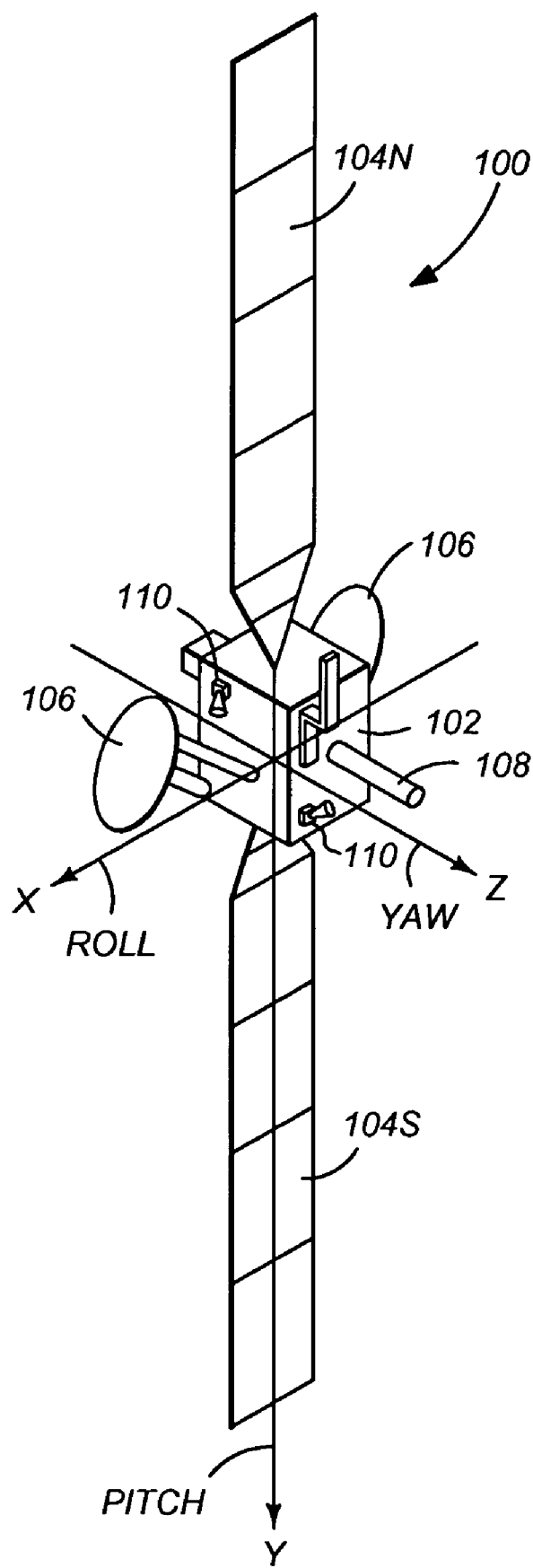
FIG. 1 illustrates a three-axis stabilized satellite or spacecraft.

FIG. 1 illustrates a three-axis stabilized satellite or spacecraft 100. The spacecraft 100 is preferably situated in a stationary orbit about the Earth. The satellite 100 has a main body 102, a pair of solar panels 104, a pair of high gain narrow beam antennas 106, and a telemetry and command omni-directional antenna 108 which is aimed at a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

The three axes of the spacecraft 100 are shown in FIG. 1. The pitch axis Y lies along the plane of the solar panels 104N and 104S. The roll axis X and yaw axis Z are perpendicular to the pitch axis Y and lie in the directions and planes shown. The antenna 108 points to the Earth along the yaw axis Z.

Figure 2:
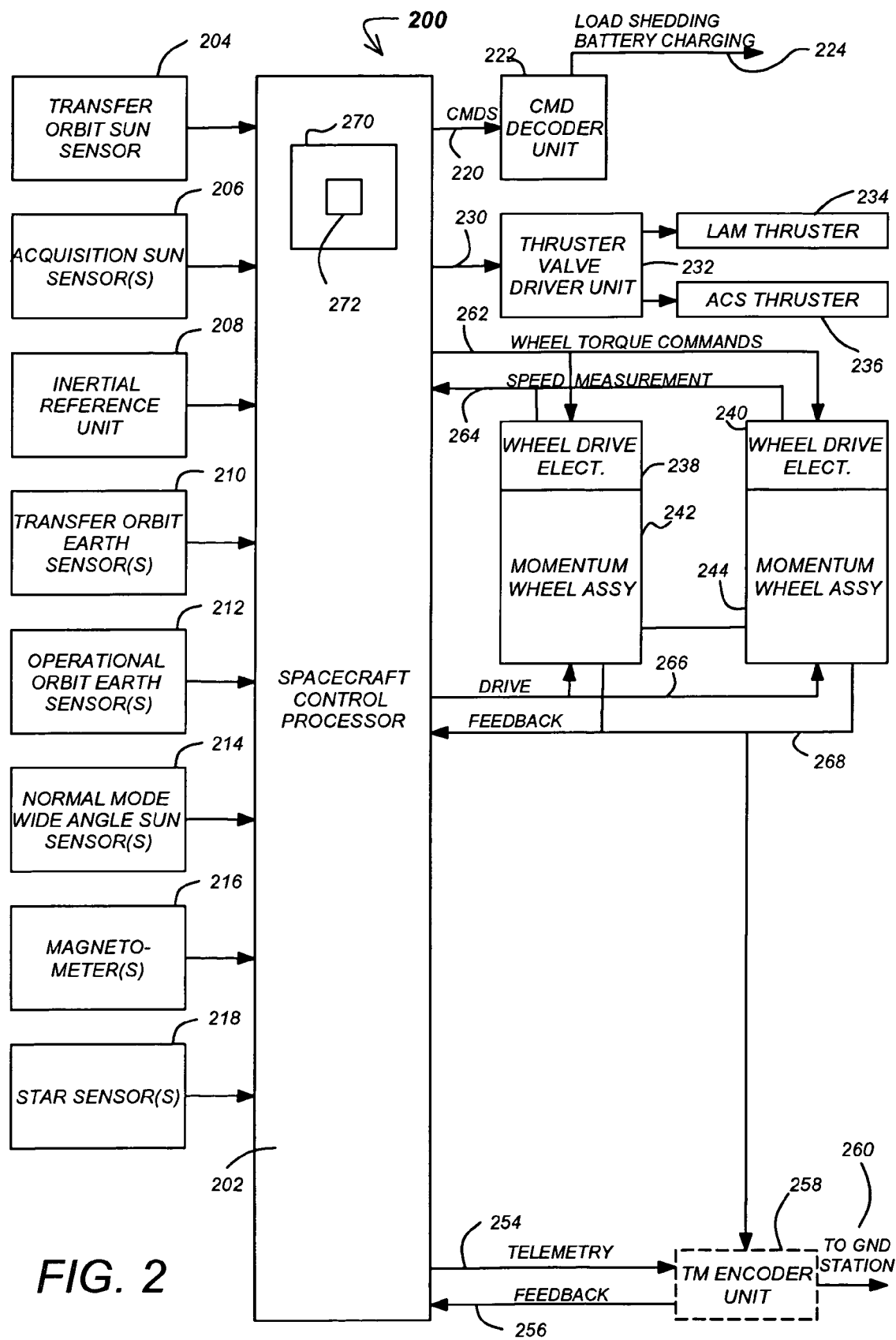
FIG. 2 is a diagram depicting the functional architecture of a representative attitude control system.

FIG. 2 is a diagram depicting the functional architecture of a representative attitude control system 200. Control of the spacecraft is provided by a computer or spacecraft control processor (SCP) 202. The SCP performs a number of functions which may include post ejection sequencing, transfer orbit processing, acquisition control, stationkeeping control, normal mode control, mechanisms control, fault protection, and spacecraft systems support, among others. The post ejection sequencing could include initializing to ascent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal. The normal mode control could include attitude estimation, attitude and solar array steering, momentum bias control, magnetic torquing, and thruster momentum dumping (H-dumping). The mechanism's mode control could include solar panel control and reflector positioning control. The spacecraft control systems support could include tracking and command processing, battery charge management and pressure transducer processing.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors (hereinafter alternatively referred to as star trackers) 218.

The SCP 202 generates control signal commands 220 which are directed to a command decoder unit 222. The command decoder unit operates the load shedding and battery charging systems 224.

The SCP 202 also sends control commands 230 to the thruster valve driver unit 232 which in turn controls the liquid apogee motor (LAM) thruster 234 and the attitude control system (ACS) thrusters 236.

Wheel torque commands 262 are generated by the SCP 202 and are communicated to the wheel electronics 238 and 240. These effect changes in the wheel speeds for wheels in momentum wheel assemblies 242 and 244, respectively. The speed of the wheels is also measured and fed back to the SCP 202 by feedback control signal 264.

The spacecraft control processor also sends jackscrew drive signals 266 to the momentum wheel assemblies 242 and 244. These signals control the operation of the jackscrews individually and thus the amount of tilt of the momentum wheels. The position of the jackscrews is then fed back through command signal 268 to the spacecraft control processor. The signals 268 are also sent to the telemetry encoder unit 258 and in turn to the ground station 260.

The spacecraft control processor also sends command signals 254 to the telemetry encoder unit 258 which in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The wheel drive electronics 238, 240 receive signals from the SCP 202 and control the rotational speed of the momentum wheels. The jackscrew drive signals 266 adjust the orientation of the angular momentum vector of the momentum wheels. This accommodates varying degrees of attitude steering agility and accommodates movement of the spacecraft as required.

The use of reaction wheels or equivalent internal torquers to control a momentum bias stabilized spacecraft allows inversion about yaw of the attitude at will without change to the attitude control. In this sense, the canting of the momentum wheel is entirely equivalent to the use of reaction wheels.

Other spacecraft employing external torquers, chemical or electric thrusters, magnetic torquers, solar pressure, etc. cannot be inverted without changing the control or reversing the wheel spin direction. This includes momentum bias spacecraft that attempt to maintain the spacecraft body fixed and steer payload elements with payload gimbals.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. It necessary, operation instructions for new applications can be uploaded from ground stations.

In one embodiment, instructions implementing the operating system 272, application programs, and other modules are tangibly embodied in a computer-readable medium, e.g., data storage device, which would include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

Attitude Determination System

Figure 3:
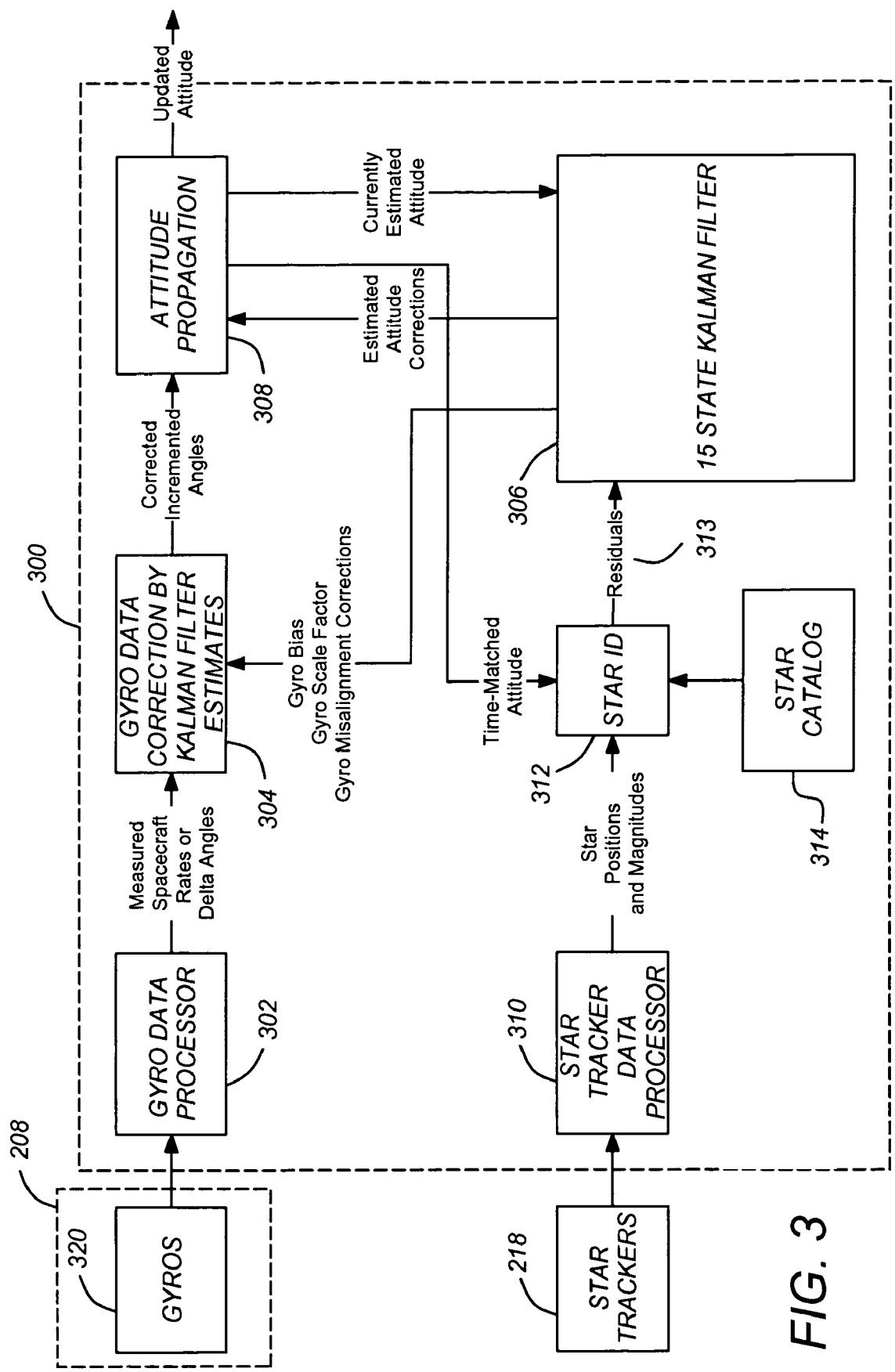
FIG. 3 is a block diagram of an attitude determination system.

FIG. 3 is a block diagram of an attitude determination system 300. The attitude determination system 300 is communicatively coupled to the rate sensors (e.g. gyros) 320 and star trackers 218. The gyros (which are typically part of the inertial reference unit 208) provide measurements of the rotation rate of the satellite 100. Typically, such measurements are taken in three separate orthogonal axes by three different instruments. Often, the gyros are integrated with accelerometers to comprise the inertial reference unit 208.

The attitude determination system 300 includes a gyro data processor 302 communicatively coupled to the gyro(s) 320 to receive satellite rotation rate data. The gyro data processor processes the raw spacecraft rotation rate measurement data to provide processed rate data or changes in spacecraft attitude (delta angles). This data is provided to a gyro data correction module 304. The gyro data correction module 304 further processes the spacecraft rotation rate data to account for gyro biases, gyro scale factors, and gyro misalignments. The estimates of the gyro biases, gyro scale factors, and gyro misalignments are provided by a Kalman filter 306.

The attitude determination system 300 also includes an attitude propagation module 308 communicatively coupled to the gyro data correction module 304. The attitude propagation module 308 accepts corrected gyro data from the gyro data correction module 304 as well as estimated attitude corrections from the Kalman filter 306, and generates an updated attitude estimate.

The Kalman filter generates the foregoing estimates from information provided by the attitude propagation module 308 (which provides data ultimately derived primarily from the gyro 320 data) and a star identification module 312 (which provides attitude data derived from the star trackers 218). The star identification module 312 provides the star measurements residuals 313, which are the differences between the measured star positions from the star tracker 218 and star tracker data processor(2) 310, and the predicted star positions based on the time-matched attitude and the information in the star catalog 314.

While the foregoing attitude determination system can provide reasonably good estimates of spacecraft 100 attitude, star tracker 218 errors can degrade performance. Temporal star tracker measurements noise is typically uncorrelated over time and can be heavily attenuated using the Kalman filter. LSF errors are typically caused by non-ideal star tracker characteristics such as optical deformation, effective focal length variation and charge transfer efficiency degradation over life, and can also be compensated for.

HSF errors have two major contributors: systematic HSF error and random HSF error. Systematic HSF error is a result of applying centroiding algorithm using a finite sampling of geometry, and the random HSF error is caused by the CCD pixel-to-pixel non-uniformity.

Figure 4:
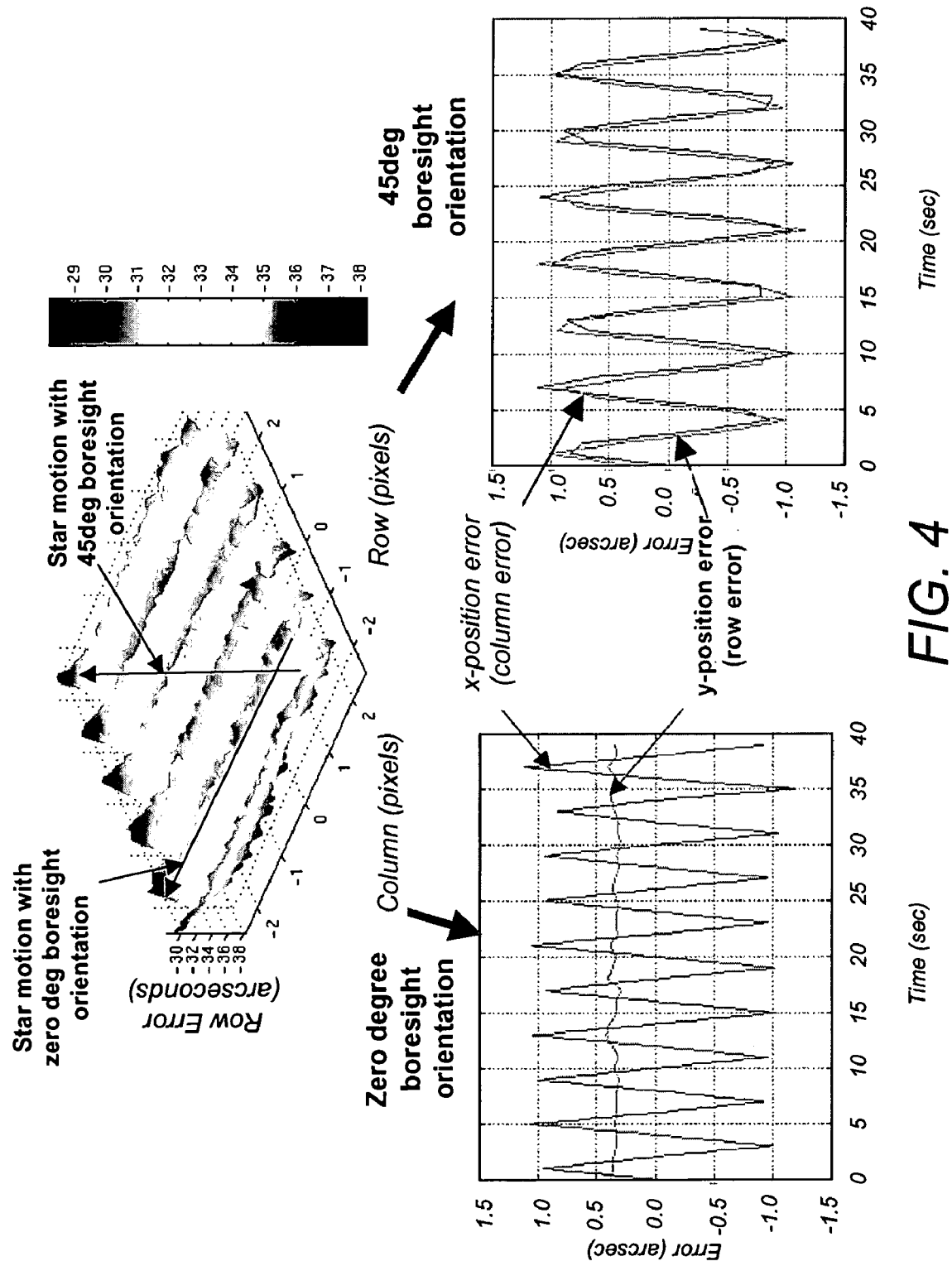
FIG. 4 is a plot showing how systematic HSF errors can become low temporal frequency errors that can not be readily attenuated by Kalman filtering techniques.

FIG. 4 is a diagram showing how systematic HSF error can be become low temporal frequency error that cannot be attenuated by a Kalman filter as taught by U.S. Pat. No. 6,566,640. It is possible to orient the star tracker's boresight so that star tracker high spatial frequency errors can be attenuated by the Kalman filter. However, such methods typically require that the star tracker boresight orientation be controlled in such 6 way that the tracked stars move nearly diagonally across the star tracker FOV in order to attenuate the systematic HSF error. For GEO satellites, this near diagonal star motion can be achieved with a fixed star tracker boresight orientation. However, for other types of orbits, such as a LEO orbit, HEO orbit, MEO orbit, or agile spacecraft missions, a complicated control for star tracker boresight orientation may be needed to obtain diagonal star motions.

Many CCD-based star trackers purposely defocus the star image so that a star will occupy several pixels. A sub-pixel resolution can be obtained in determining the star center position from the defocused image.

Figure 5:
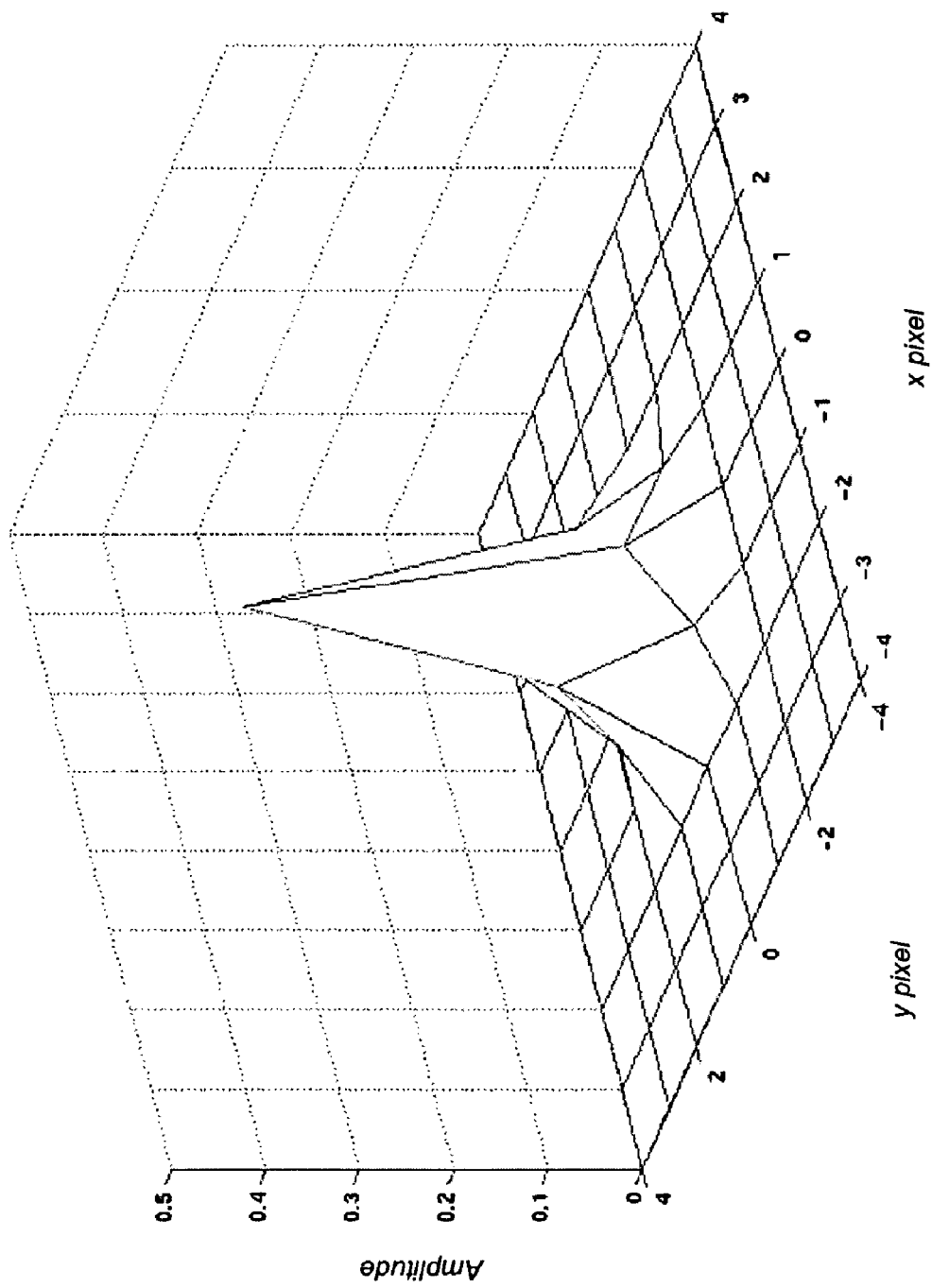
FIG. 5 is a diagram showing a defocused star image on an array of CCD pixels.

FIG. 5 is a diagram showing a defocused star image on an array of CCD pixels. In the illustrated example, the pixel standard deviation is $\sigma_x=\sigma_y=0.5$ pixel, the first axis boresight is $x_0=-0.1$ pixels and the first axis boresight $y_0=0.1$ pixels.

A star image can be described by the point spread function (PSF), $$PSF(x, y, x_0, y_0) = PSF(x, x_0)PSF(y, y_0) = \frac{1}{\sqrt{2\pi}\,\sigma_x}e^{-\frac{1}{2}\left(\frac{x-x_0}{\sigma_x}\right)^2}\frac{1}{\sqrt{2\pi}\,\sigma_x}e^{-\frac{1}{2}\left(\frac{y-y_0}{\sigma_y}\right)^2} \quad \text{Equation (1)}$$

wherein x is a first axis, y is a second axis, $x_0$ is the star image center location along the first axis and $y_0$ is the star image center location along the second axis. Given this formulation of the star image, the energy or amplitude each star tracker CCD pixel received can be expressed as:

$$AMP(m, n, x_0, y_0) = \left\{ \int_{m-0.5}^{m+0.5} \frac{1}{\sqrt{2\pi}\,\sigma_x} e^{-\frac{1}{2}\left(\frac{x-x_0}{\sigma_x}\right)} dx \right\}$$
$$\left\{ \int_{n-0.5}^{n+0.5} \frac{1}{\sqrt{2\pi}\,\sigma_y} e^{-\frac{1}{2}\left(\frac{y-y_0}{\sigma_y}\right)} dy \right\}$$

Equation (2)

where m and n are integers.

Using the received amplitude from pixels, the star image center location be estimated or computed as follows:

$$\hat{x}_0 = \frac{\sum_n \sum_m m * AMP(m, n, x_0, y_0)}{\sum_m \sum_n AMP(m, n, x_0, y_0)} \text{ and}$$

Equation (3)

$$\hat{y}_0 = \frac{\sum_m \sum_n n * AMP(m, n, x_0, y_0)}{\sum_m \sum_n AMP(m, n, x_0, y_0)}$$

Equation (4)

Figure 6:
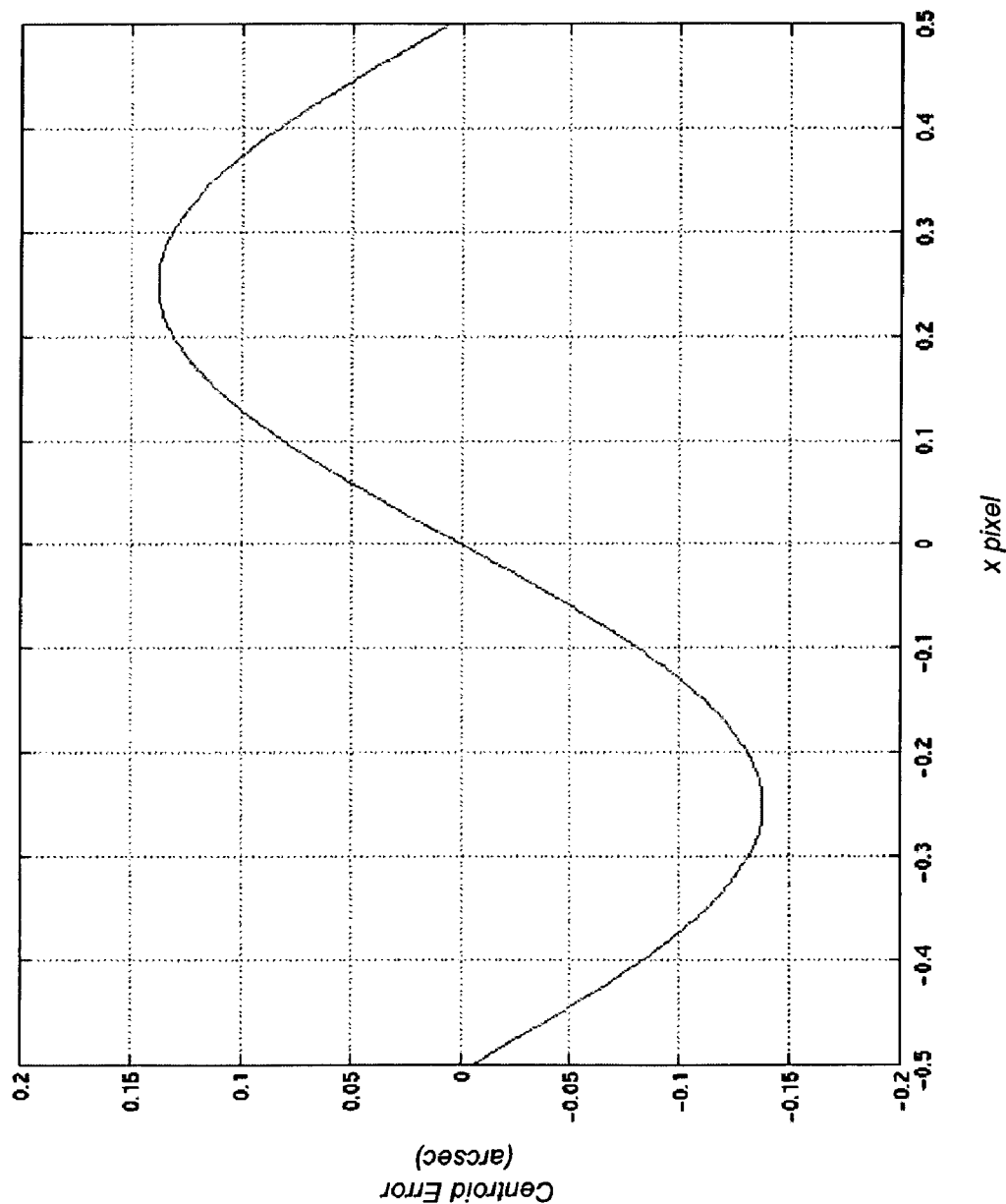
FIG. 6 is a diagram showing centroiding error without CCD pixel noise.

Without CCD pixel noise, the centroiding error, defined as: $x_0 - \hat{x}_0$ or $y_0 - \hat{y}_0$, can be well characterized as shown in FIG. 6 as a function of pixel phasing.

Figure 7:
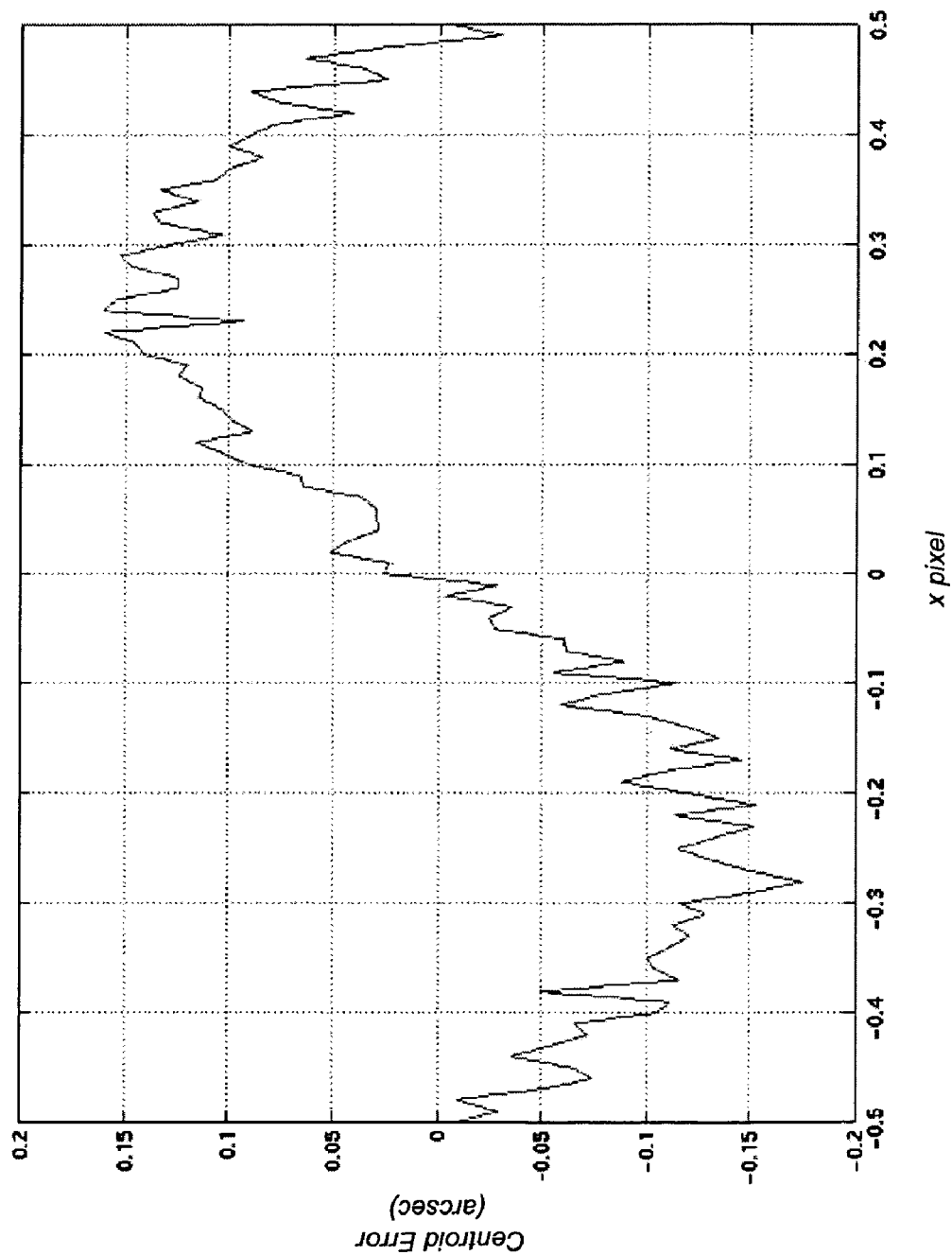
FIG. 7 is a diagram showing centroiding error with CCD pixel noise.

FIG. 7 is a diagram showing centroiding error with CCD pixel noise. The existence of this systematic HSF error called "S-curve" is further evident from the actual star tracker test data as shown by FIG. 4. Because of this well-characterizable HSF error, star tracker 218 data can be processed to remove the systematic HSF error to improve the performance of the stellar inertial attitude determination. This processing can occur in parallel with other star measurement processes, or the data may be simply post processed.

Centroiding Error Reduction Techniques

Figure 8:
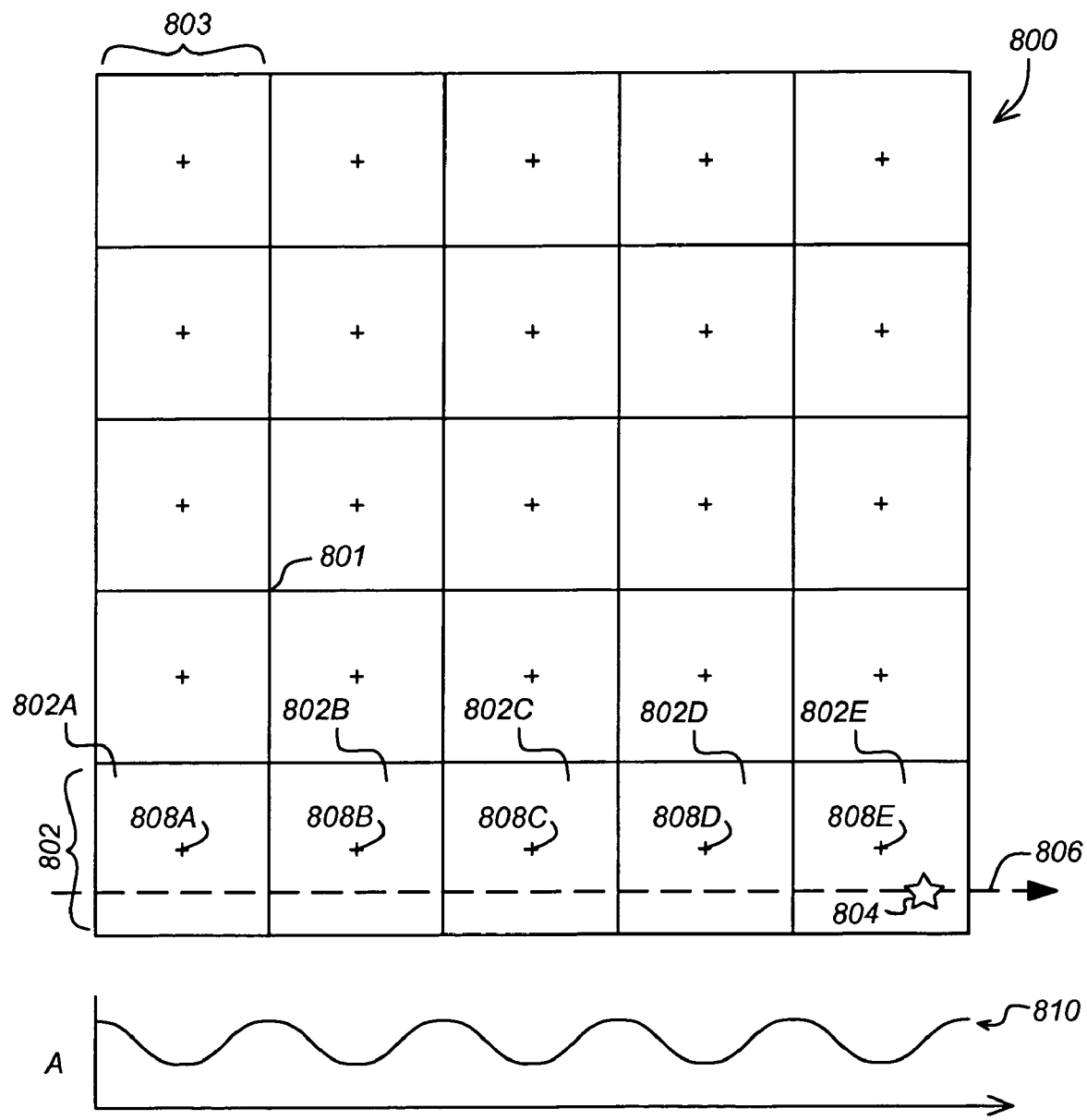
FIG. 8 is a diagram illustrating an exemplary pixel array and methods for reducing HSF centroiding error.

FIG. 8 shows an exemplary star sensor pixel array 800. The array has a plurality of pixels arranged in rows (e.g. row 802) and columns (e.g. column 803). In the illustrated embodiment, pixel row 802 comprises pixels 802A-802E, each with an associated pixel centroid 808A-808E. Star sensor angular motion (either from the angular motion of the star sensor 218 relative to the spacecraft 100 it is mounted on, or if the star sensor 218 is fixed to the spacecraft 100, from the motion of the spacecraft 100 itself) results in apparent motion of stars within the field of view of the star sensor 218. As illustrated in FIG. 8, star sensor 218 angular motion results in the apparent motion of star centroid 804 from left to right along path 806. For illustrative purposes, the relative motion of the star centroid 804 is illustrated as along a single row 802 of pixels. However, generally, star motion will cross several pixel rows and columns.

Each of the pixels in the array 800 integrates the amount of gathered starlight over a particular integration period τ, and reports that integrated amount of light as a value. Each pixel is incapable of resolving star positions within the pixel itself, and therefore reports the star position as if it were centered on the pixel. This results in centroiding error, which is the difference between the centroid of the pixel and the actual position of the star image.

As the star image passes through each pixel 802A-802E, the systematic centroiding error (shown as plot 810 in FIG. 8) varies sinusoidally with time.

One technique for reducing centroiding error is to inertially hold the attitude of the spacecraft 100 or the star tracker 218 at the center of a pixel (e.g., at point 808A of pixel 802A), or preferably, at the intersection of four pixels (e.g., at point 801). White this technique is intuitively simple, it is very difficult to accomplish for more than one star at a time, and many star trackers 218 track 2-6 stars in the field of view at a time.

Another technique is to slow the spacecraft 100 (or the star tracker 218, if it can be slewed with respect to the spacecraft 100) and use averaging techniques to reduce the effect of centroiding error. This technique can result in greater residual centroiding error (since the spacecraft is slewed), especially if star viewing opportunities are short (e.g., when attempting to get a star fix between scale factor calibration slews, or between tasking intervals of an agile spacecraft).

Another technique is to use a least squares technique or other centroiding algorithms to reduce the effect of the centroiding error. However, such techniques greatly increase the processing burden.

Another possible technique is illustrated in U.S. Pat. No. 6,566,640, for "System and Method for Autonomous Correction of Star Tracker High Spatial Frequency (HSF) Error, issued to Yeong-Wei Wu and Rongsheng Li on May 20, 2003, which is hereby incorporated by reference herein. This technique adds a correction based on the estimated star centroid in a pixel based upon factors such as the star magnitude, slew rate and pixel phase. While effective, this technique also increase the processing burden.

The present invention improves the accuracy of star sensor data without imposing burdensome processing requirements. This is accomplished by slewing the star sensor at specifically selected slew rates, and applying specific filters to the data collected while slewing the star sensor. By appropriate selection of the slew rate (and in one embodiment, the direction), the centroiding error is either nulled out or can be characterized by a constant spatial frequency that can be reduced by appropriate filtering.

Figure 9A:
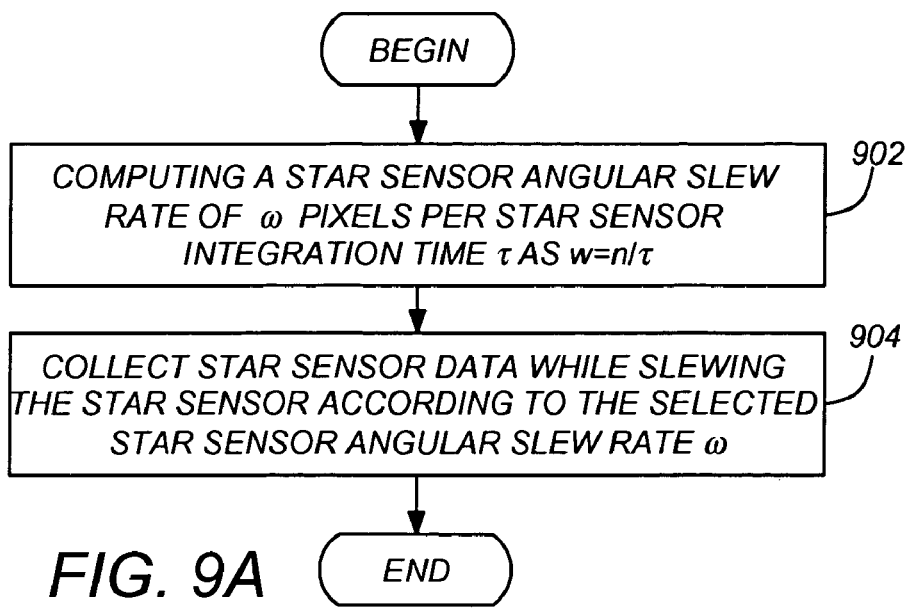
FIG. 9A is a flow chart illustrating an exemplary technique for reducing systematic centroiding error without filtering collected star sensor data.
Figure 9B:
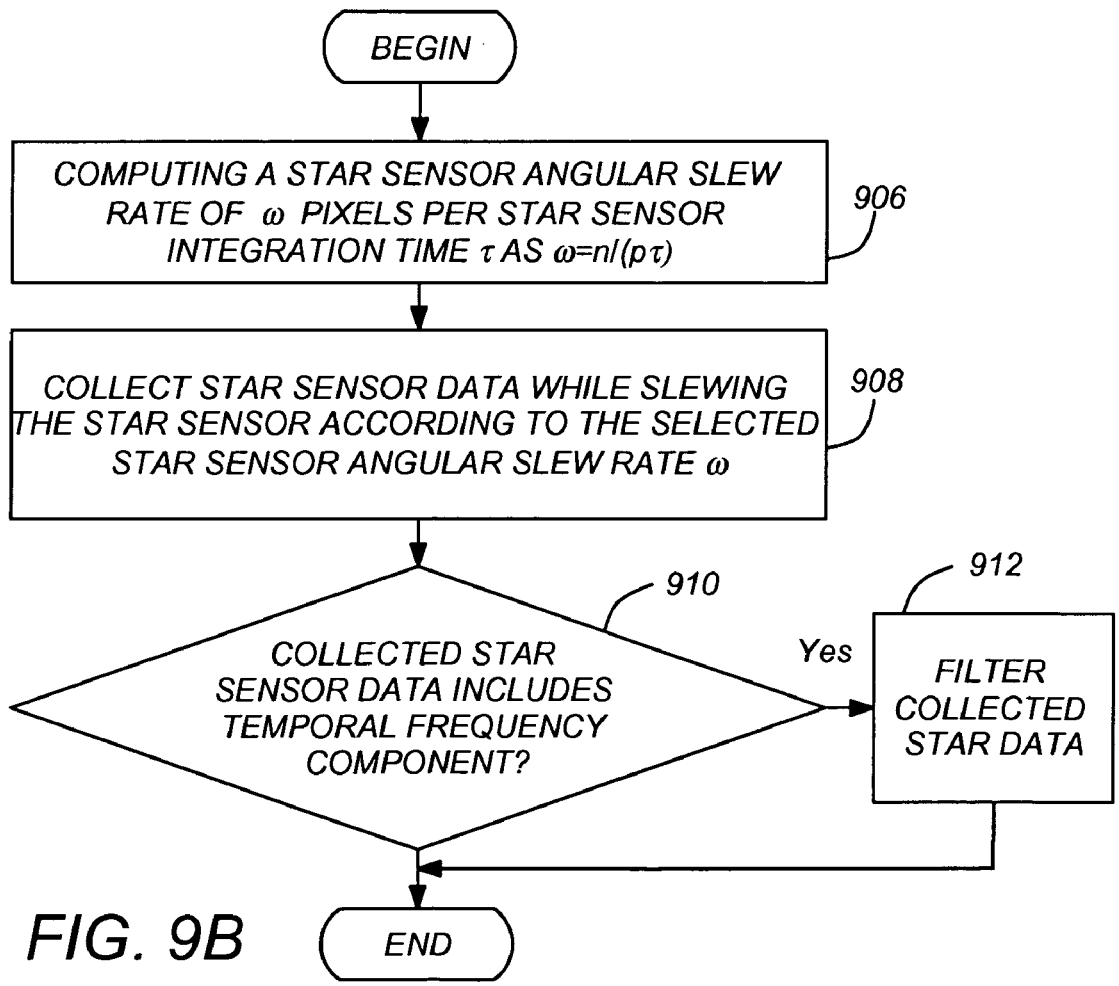
FIG. 9B is a flow chart illustrating another exemplary technique for reducing systematic centroiding error.

FIGS. 9A and 9B are flow charts illustrating exemplary methods of reducing systematic centroiding error. FIG. 9A illustrates a technique that nulls centroiding error without the need for filtering the collected star sensor data (although such filtering may be provided if desired), but provides less flexibility in the choice of slew rate and/or related design parameters. FIG. 9B illustrates a technique that can employ a variety of slew rates, but may require filtering of the collected star sensor data. Both techniques are described briefly with reference to FIGS. 9A and 9B, and more fully below.

Turning first to FIG. 9A, block 902 shows the computation of a star sensor angular slew rate of ω pixels per star sensor integration period τ as $$\omega = \frac{n}{\tau},$$

wherein n is a positive integer. Star sensor data is then collected while slewing the star sensor 218 at the computed angular slew rate, as shown in block 904.

Turning now to FIG. 9B, block 906 illustrates the computation of a star sensor angular slew rate of ω pixels per star sensor integration period τ as $$\omega = \frac{n}{p\tau}$$

wherein n and p are positive integers. In block 908, star sensor data is collected while the star sensor is slewed at the computed rate. If the collected star data includes temporal frequency components (due to the selection of n, p, and the phasing of the pixel readout versus the star centroid's crossing of pixel boundaries as described below), the collected star data is filtered, as shown in blocks 910 and 912. If the data does not include temporal frequency components, filtering is not required. In one embodiment, the collected star sensor data is then filtered according to a frequency determined by the selected star sensor angular slew rate.

Figure 10A:
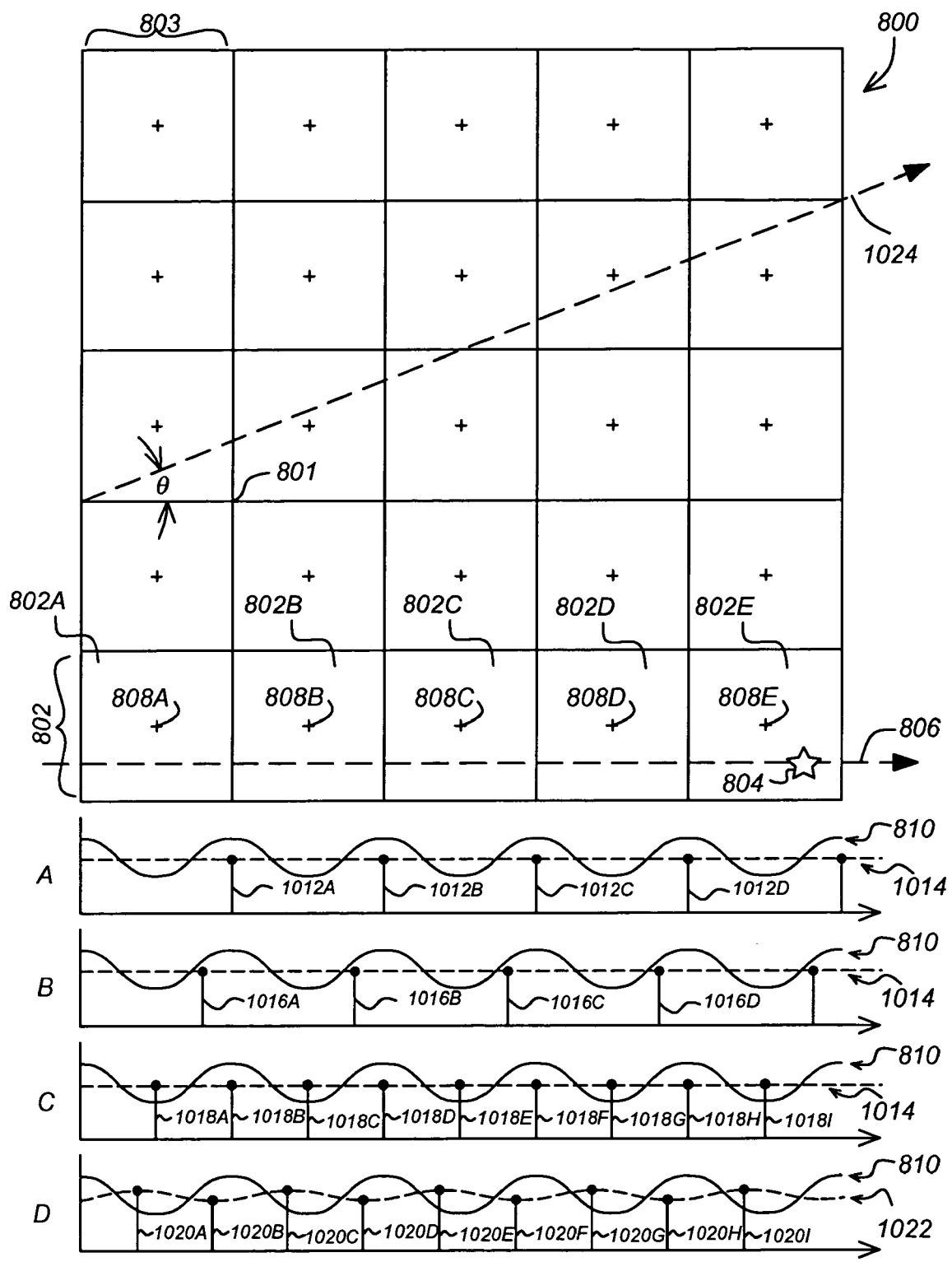
FIGS. 10A and 10B are diagrams illustrating the effect of the selection of the star sensor slew rate in terms of pixel integration time.

FIG. 10A is a diagram illustrating the effect of the selection of the slew rate in terms of pixel integration time on the centroiding error. Plots A and B show an embodiment wherein the angular slew rate ω is selected as $$\frac{n}{\tau}$$

pixels per second, wherein n is unity.

In Plot A, the end of the integration period coincides with the star's passing through the boundary from one pixel to the adjacent pixel (e.g., data is produced by pixel 802A as shown by data point 1012A at a time when the star centroid 804 passes through the boundary between pixels 802A and 802B). This results in trace 1014.

In Plot B, the end of the pixel integration period and the motion of the star centroid 804 across the pixels is phased so that the integration period is completed before the star centroid 804 reaches the boundary between pixels (e.g. the data produced by pixel 802A as shown by data point 1016A is produced before the star centroid 804 passes through the boundary between pixels 802A and 802B). Note, however, that despite the random phasing between the star centroid 804 motion across the pixel array 800 and the integration period τ, the selection of the rate as $$\frac{1}{\tau}$$

pixels per second provides the same data magnitude (e.g. data points values 1012A-1012D are the same as data point values 1016A-1016D). The same result would be obtained if the rate were any integer multiple of the value shown in Plots A and B $$\left(e.g. \ \frac{2}{\tau}, \frac{3}{\tau}, \frac{4}{\tau}, \ \text{etc.}\right).$$

Therefore, in cases where the star sensor 218 finds the star centroid simply by centroiding the integrated pixels, systematic centroiding error can be substantially nulled by slewing the star sensor 218 such that the star centroids move in the star sensor's FOV during the star sensor integration period τ by an integral number of pixels in a row of pixels {n=1,2,3, . . .} of at least one of the star sensors. In one embodiment, results are obtained by slewing the star sensor during the integration period by an integral number of pixels in a column of pixels {m=1,2,3, . . . }, or both rows and columns of pixels, and by using multiple star sensors 218. In either case, this technique effectively nulls out the systematic centroiding error because the centroiding error, averaged across a pixel, is sinusoidal at the pixel frequency, and the star tracker integration essentially averages this error (to zero) over an integral number of cycles for each star tracker integration output (e.g. data points 1012A-1012D and 1016A-1016D).

Another alternative implementation is to compute and select the slew rate such that the motion during an integration period produces a fixed frequency error, which can be then filtered out by a temporal filter. In this case, the angular slew rate ω is selected so that it is defined as $$\frac{n}{p}$$

pixels per integration period τ, or $$\omega = \frac{\frac{n}{p}}{\tau} = \frac{n}{p\tau}. \qquad \text{Equation (5)}$$

So, where p=2, the star sensor 218 is slewed so that the star centroid 804 passes through $$\frac{n}{2}$$

pixels columns and/or $$\frac{m}{2}$$

pixel rows per integration period τ. Plot C of FIG. 10 illustrates a situation wherein n=1 and p=2. If the phasing of the motion of the star centroid 804 is such that the star sensor 218 integration period ends when the star centroid 804 is midway between the center of the pixel and an adjacent edge, at x=−0.25 pixel or x=+0.25 pixel in the coordinate system of FIG. 6, the systematic centroiding error cancels in much the same way as was the case for Plot A. However, with random phasing between the motion of the star centroid 804 and the end of the pixel integration period, the centroiding error is sinusoidal (as shown in trace 1022 of plot D) with the same period, but with an amplitude proportional to the spatial phase of the periodic centroiding error function.

Figure 10B:
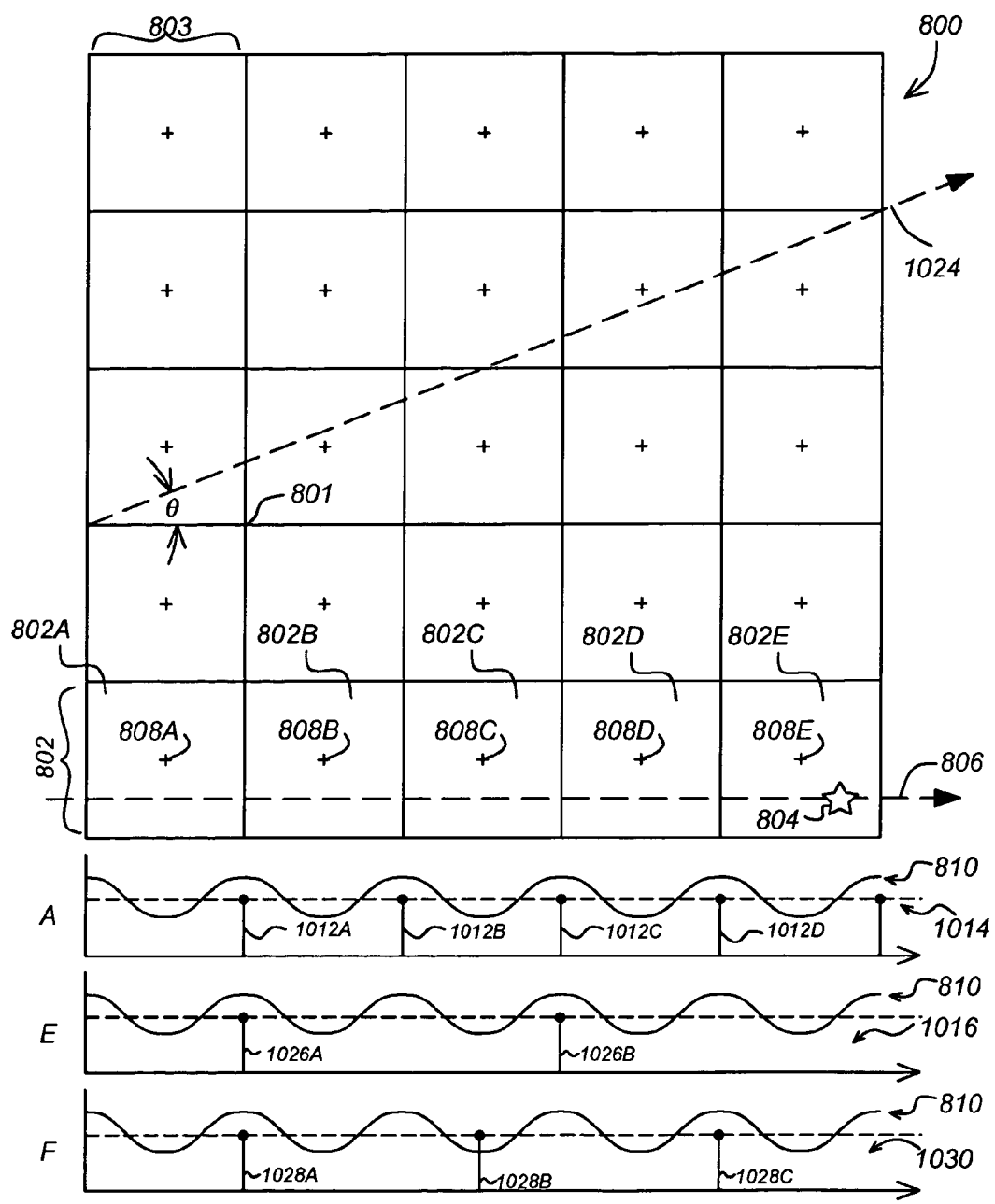

FIG. 10B is a diagram illustrating the centroiding error and the effect of the slew rate for additional cases of interest.

Plot A is the same as Plot A presented in FIG. 10A for comparison purposes.

Plot E shows a trace 1016 for the simple case where $$\omega = \frac{2}{\tau}$$

pixels per second. Note that as was the case in Plot A, there are no centroiding error components.

Plot F shows a case wherein $$\omega = \frac{\frac{3}{2}}{\tau} = \frac{3}{2\tau}$$

pixels per second. Note that as was the case in plot A, there are no centroiding error components.

The periodic centroiding errors described above can be reduced or eliminated by appropriate filtering. Such filtering can be accomplished in a variety of ways.

Figure 11:
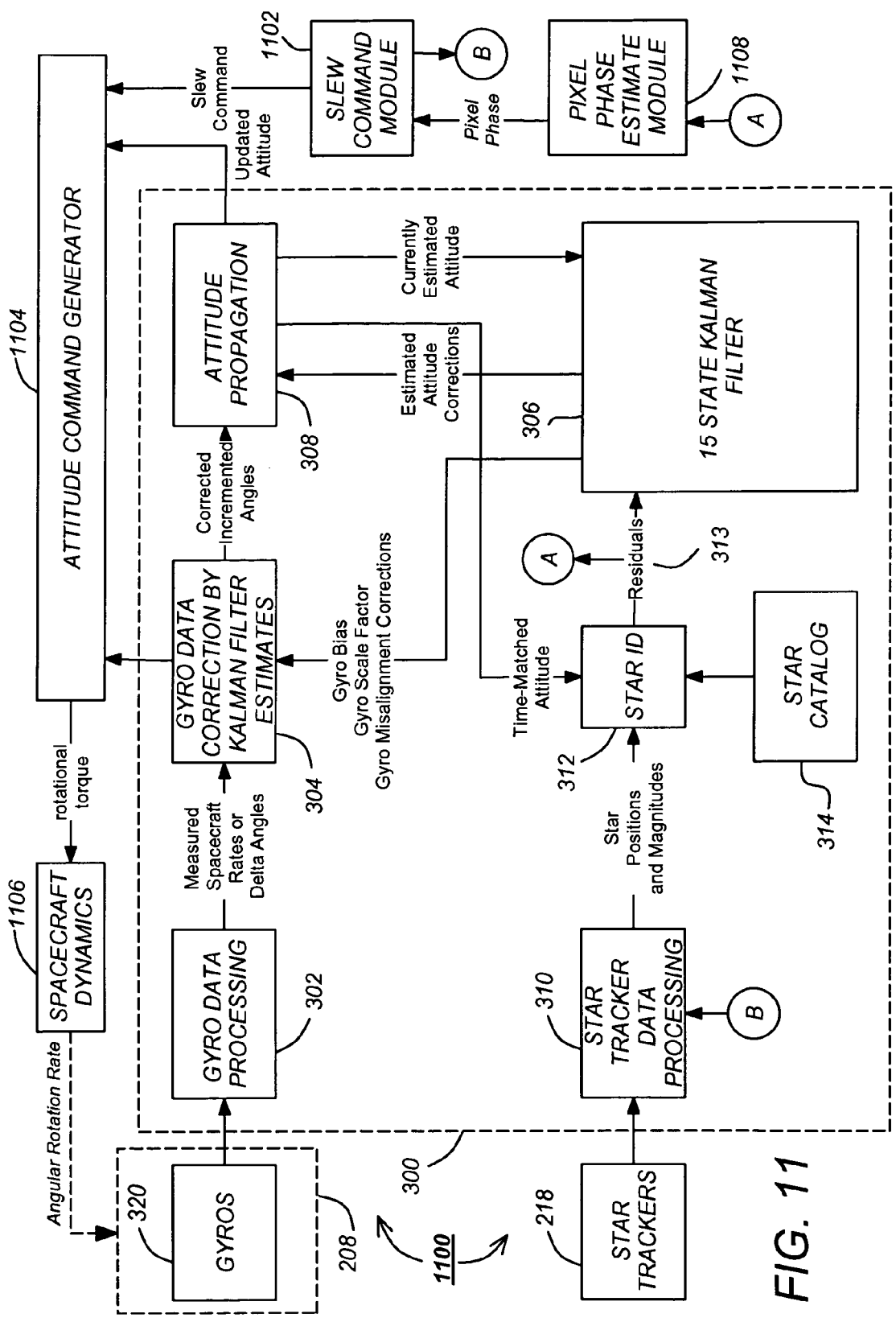
FIG. 11 is a representation of an attitude control system implementing systematic centroiding error reduction techniques.

FIG. 11 is a another representation of an attitude control system 1100, which comprises the attitude determination system 300, augmented by a representation of the attitude command generator 1104. The attitude command generator 1104 accepts gyro data and spacecraft attitude estimates computes and applies commands for the momentum wheels 242, 244 and ACS thrusters 2326 to apply rotational torque to the spacecraft 100. This rotational torque is applied to the spacecraft 100 (represented by spacecraft dynamics 1106), resulting in a spacecraft angular rate that is sensed by the gyros 320. Some spacecraft attitude control systems 1100 are characterizable by a closed loop frequency response that includes nulls at particular frequencies. Using the relationships described in this specification, the rotation rate ω of the star sensor 218 can be chosen so that the frequency of the centroiding error occurs at an existing null of the attitude control system 1100. This embodiment is advantageous in that it does not require additional filters, whether implemented by additional processing, additional processors, or analog filtering modules.

The periodic centroiding error may also be reduced or eliminated by the use of filters especially designed for this purpose, thus permitting greater flexibility in the choice of the star sensor 218 slew rate. Such filters may be analog or digital filters, and among digital filters, can include infinite impulse response (IIR) filters or finite impulse response (FIR) filters such as moving average filters, and can be implemented in the star tracker data processing module 310 shown in FIG. 11. For example, if the amplitude of the centroiding error shown in trace 1022 is (+A) for a given star centroid 804 for a half cycle (e.g. the difference between the value of data point 1020A and 1018A of FIG. 10) and (−A) for a given star centroid 804 for the next half cycle (e.g. the difference between the value of data point 1020B and 1018B), then successive measurements have error values of (+A) and (−A). If such measurements are provided to a FIR filter with weights of [0.5, 0.5], these errors will be canceled exactly, if the slew rate ω is exactly one half of the pixel frequency (which is the reciprocal of the pixel integration interval τ).

Figure 12:
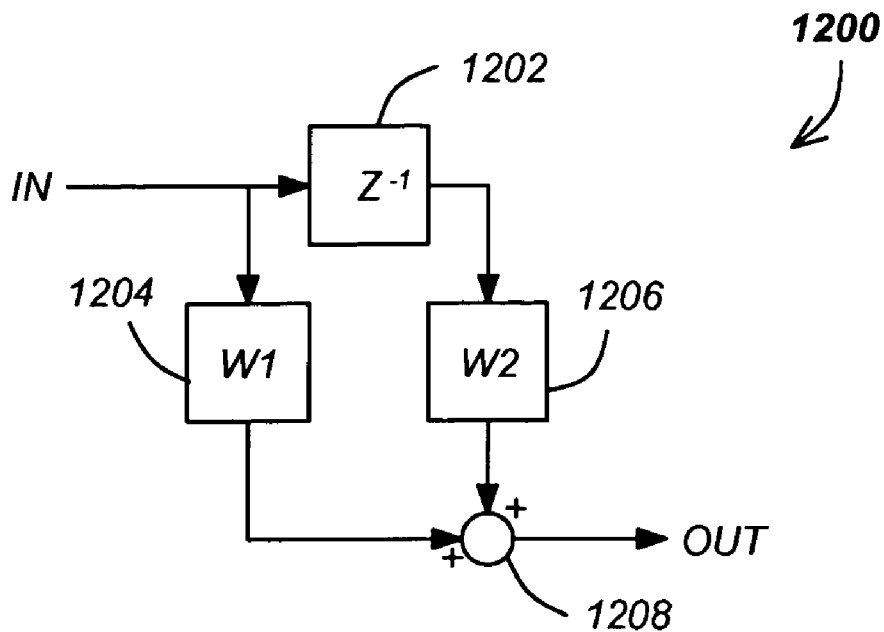
FIG. 12 is a block diagram of an exemplary two-point moving average finite impulse response filter.

Slew commands are generated by a slew command module 1102, which provides the designated slew command to the attitude command generator 1104 and also provides the slew command to the star tracker data processing module 310 so that a filter with appropriate frequency domain characteristics is selected. FIG. 12 is a diagram illustrating an exemplary FIR filter 1200 that can be used to filter the sinusoidal components of the centroiding error. This FIR filter 1200 is essentially a two sample, moving average filter. Measurements are provided to an input of the FIR filter 1200. The input is weighted by value W1=0.5, and provided to summer 1208. The summer 1208 sums this value and the previous input value (which emanates from delay element 1202) weighted by value W2=0.5. The output of the summer 1208 is the output of the FIR filter 1200. The FIR filer 1200 illustrated in FIG. 12 is a notch filter having a V-shaped frequency response with the notch frequency at the pixel frequency.

Figure 13:
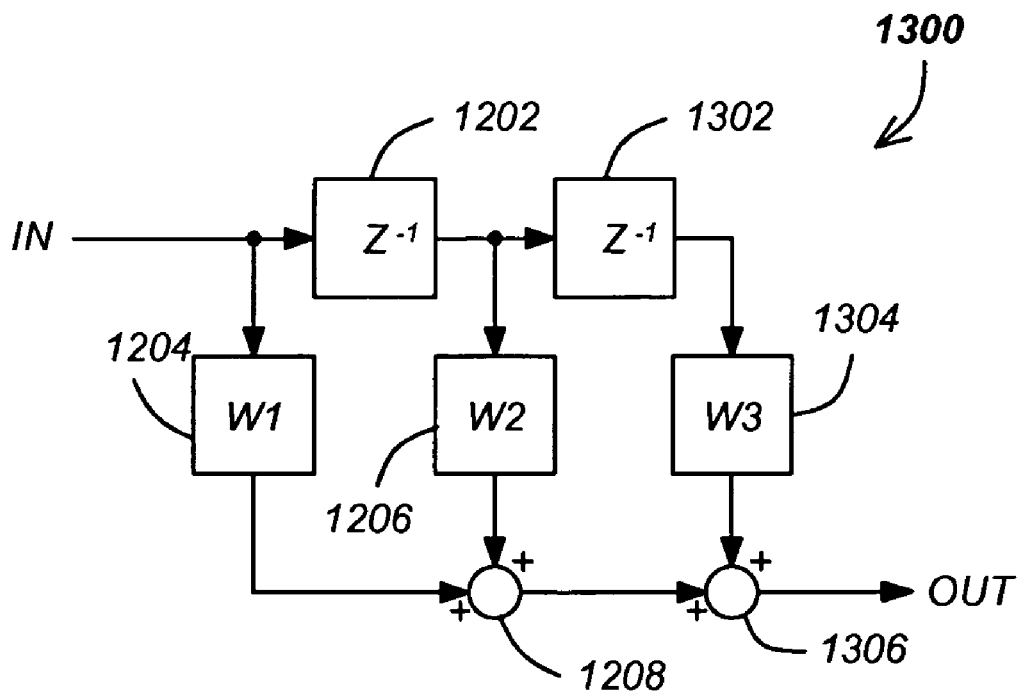
FIG. 13 is a block diagram of an exemplary three-point moving average finite impulse response filter.

FIG. 13 is a diagram of another exemplary FIR filter 1300 that can be used to filter the sinusoidal components of the centroiding error. This FIR filter 1300 is essentially a three sample moving average filter. The three sample moving average filter operates like the two sample moving average filter, except that the output is a sum of a current input sample weighted by weight W1 1204, a previous input sample weighted by weight W2 1206, and an input sample (obtained by applying the delayed output of delay element 1202 to delay element 1302) preceding the previous input sample weighted by weight W3 1304. If the values of W1, W2, and W3 are 0.25, 0.5, and 0.25, respectively, the sinusoidal components of the centroiding error are well compensated for, even if the slew rate ω is not precisely the pixel frequency $$\frac{1}{\tau}.$$

This and other filters that can be used for producing frequency-insensitive nulls are discussed in U.S. Pat. No. 6,032,903, which is hereby incorporated by reference.

Note that generally, stars centroids 804 sensed by the star tracker 218 will have movement rates that are slightly different than the desired rate, and from the rates of other stars in the FOV, and from the stars in other star trackers. This is due to such factors as inexact slew speed control, variation in the star centroid 804 motion over the field of view (since different stars will move on minor circles of different radii and star sensors 218 frequently have optical distortion over their FOV), and variation in star rate across different star sensors 218 (which can be minimized by slewing in a direction whose pole is in the plane formed by the average and the cross-product of two star sensor boresights, and preferably orthogonal to two star sensor boresights). The slew rate ω can be changed slightly to account of such effects, for example, selecting the slew rate ω that minimizes the maximum error (minimax) over the tracked stars in the FOV, a weighted minimax using stars within the field of view, or computed for the star tracker 218 boresight rather than for a particular star.

The foregoing approach can be generalized to other slew rates and filter structures. For example, a p-point moving average filter can be used to null the centroiding errors while slewing the star sensor 218 at $$\frac{n}{p}$$

pixels per integration period, or such that $$\omega = \frac{\frac{n}{p}}{\tau} = \frac{n}{p\tau}$$

wherein n and p are positive integers (e.g. $\{n=1,2,3,\ldots\}$ and $\{p=1,2,3,\ldots\}$).

By the use of selectable temporal filters and selectable slew rates, the number of permissible slew rates can be very large. For example, a typical star tracker 218 includes an 8×8 degree FOV using a 512×512 pixel charge coupled device (CCD) array, an integration period of 0.2 seconds, and an allowable star centroid 804 motion of 0.4 degrees per second. For diagonal slews (e.g. slews where the angle θ with respect to a row 802 of the pixel array 800 depicted in FIG. 10A and 10B is equal to 45 degrees) of n pixels per second (using p=1 so that the star centroid 804 traverses n rows and m columns per integration period τ, and the centroiding error is nulled without the need for downstream filtering of the collected star data) the slew rate ω can be selected so that n=1, 2, or 3 with n=m for a rate of 1, 2, and 3 pixels per integration period, or 0.1105, 0.2210, or 0.3315 degrees per second. By use of a selectable moving average filter of up to four samples, slew rates of $$\frac{1}{4}, \frac{1}{3}, \frac{1}{2}, \frac{2}{3}, \text{ and } \frac{3}{4}$$

pixels per second can be used as well, providing 21 rates (up to $$\frac{7}{2}$$

pixels per integration period (or 0.3838 degrees/second) below the allowable 0.4 degrees/second. By using different slew rates in the row and column directions, many more allowable slew directions can be used. Such a selectable filter can be implemented using a circular buffer of the last four measurement residuals (the difference between the measured and expected positions) for each star. Generally, for spacecraft with multiple trackers slewing about arbitrary axes, the star crossing rates (pixels per integration period rates at which star sensors cross pixels) will be different in different star sensors 218, different in different star centroids 804 in a given star sensor 218, and different (depending on the slew direction θ) across the CCD rows and columns for a given star sensor 218. However, this can be accounted for by the choice or appropriate filtering on as fine a granularity as a per star row/column, per sample basis using the approach outlined above and described in more detail below.

To further explain how the proposed pixel frequency slews work, consider a star image that can be characterized by a Gaussian-like point spread function (PSF) described earlier in Equation (1):

$$PSF(x, y, x_0, y_0) = \frac{1}{\sqrt{2\pi}\,\sigma_x} e^{-\frac{1}{2}\left(\frac{x-x_0}{\sigma_x}\right)^2} \frac{1}{\sqrt{2\pi}\,\sigma_y} e^{-\frac{1}{2}\left(\frac{y-y_0}{\sigma_y}\right)^2} \quad \text{Equation (1)}$$

where $x_0$ and $y_0$ are star image positions (in pixels), $\sigma$, $\sigma_y$ are star tracker design parameters that produce the desired star image blur size, and x and y are positions in the CCD arrays. The energy or amplitude each CCD pixel (located at $j^{th}$ and $k^{th}$ pixel) received during integration time, τ, can be expressed as:

$$AMP(j, k, x_0, y_0) = \quad \text{Equation (6)}$$

$$\left\{ \int_{j-0.5}^{j+0.5} \frac{1}{\sqrt{2\pi}\,\sigma_x} \left\{ \frac{1}{\tau} \int_0^\tau e^{-\frac{1}{2}\left(\frac{x-x_0}{\sigma_x}\right)^2} dt \right\} dx \right\}$$

$$\left\{ \int_{k-0.5}^{k+0.5} \frac{1}{\sqrt{2\pi}\,\sigma_y} \left\{ \frac{1}{\tau} \int_0^\tau e^{-\frac{1}{2}\left(\frac{y-y_0}{\sigma_y}\right)^2} dt \right\} dy \right\}$$

For a stationary star, the positions, x0 and y0 will be constants, however, for a moving star with a constant rate ($\omega_x$ or $\omega_y$) during pixel integration, the positions, x0 and y0 will be a function of time, t:

$$x_0(t) = x00 + \omega_x t;\ y_0(t) = y00 + \omega_y t \quad \text{Equations (7) and (8)}$$

where x00 and y00 are the initial star positions at the beginning of pixel integration. Using the received amplitudes from pixels, the star image center location can be estimated or computed as follows:

$$\hat{x}_0 = \frac{\sum_k \sum_j j * AMP(j, k, x_0, y_0)}{\sum_j \sum_k AMP(j, k, x_0, y_0)}; \quad \text{Equations (9) and (10)}$$

$$\hat{y}_0 = \frac{\sum_j \sum_k k * AMP(j, k, x_0, y_0)}{\sum_j \sum_k AMP(j, k, x_0, y_0)}$$

Using the foregoing four equations, one can show that for a stationary star without CCD pixel noises the centroiding error (defined as: $x_0 - \hat{x}_0$ or $y_0 - \hat{y}_0$) has an error characteristics shown by FIG. 6. In other words, the errors: $x_0 - \hat{x}_0$ and $y_0 - \hat{y}_0$ can be expressed as:

$$x_0 - \hat{x}_0 = \alpha_x \sin(2\pi x_0);\ y_0 - \hat{y}_0 = \alpha_y \sin(2\pi y_0) \quad \text{Equations (11) and (12)}$$

The existence of this systematic error called "S-curve" is further evident from the actual star tracker test data as shown in FIG. 4.

Now for a moving star with a constant rate, ω (in pixels per second) and a moving direction angle θ, the centroiding errors become:

$$x_0 - \hat{x}_0 = \frac{1}{\tau} \int_0^\tau a_x \sin(2\pi x_0(t)) dt \quad \text{Equations (12) and (13)}$$

$$= a_x \left( \frac{\sin(\pi \omega_x \tau)}{\pi \omega_x \tau} \right) \sin\left(2\pi\left(x00 + \frac{\omega_x}{2}\right)\right)$$

$$y_0 - \hat{y}_0 = \frac{1}{\tau} \int_0^\tau a_y \sin(2\pi y_0(t)) dt$$

$$= a_y \left( \frac{\sin(\pi \omega_y \tau)}{\pi \omega_y \tau} \right) \sin\left(2\pi\left(y00 + \frac{\omega_y}{2}\right)\right)$$

with $\omega_x = \omega\cos\theta$, $\omega_y = \omega\sin\theta$. To obtain Equations (12) and (13), we interchange the order of integration between time domain and spatial domain of Equation (6):

$$AMP(j, k, x0, y0) = \quad \text{Equation (14)}$$

$$\left\{\frac{1}{\tau}\int_0^\tau \left\{\int_{j-0.5}^{j+0.5} \frac{1}{\sqrt{2\pi}\,\sigma_x} e^{-\frac{1}{2}\left(\frac{x-x0(t)}{\sigma_x}\right)^2} dx\right\} dt\right\}$$

$$\left\{\frac{1}{\tau}\int_0^\tau \left\{\int_{k-0.5}^{k+0.5} \frac{1}{\sqrt{2\pi}\,\sigma_y} e^{-\frac{1}{2}\left(\frac{y-y0(t)}{\sigma_y}\right)^2} dy\right\} dt\right\}$$

So given an integration time, $\tau$, if one can choose the motion rate, $\omega$ and the moving direction angle, $\theta$, such that:

$$\omega\cos\theta = \frac{n}{\tau} \quad \text{Equations (15) and (16)}$$
$$\omega\sin\theta = \frac{m}{\tau}$$

where n and m are arbitrary integers, then the above centroiding errors vanish or become zeros.

Figure 14:
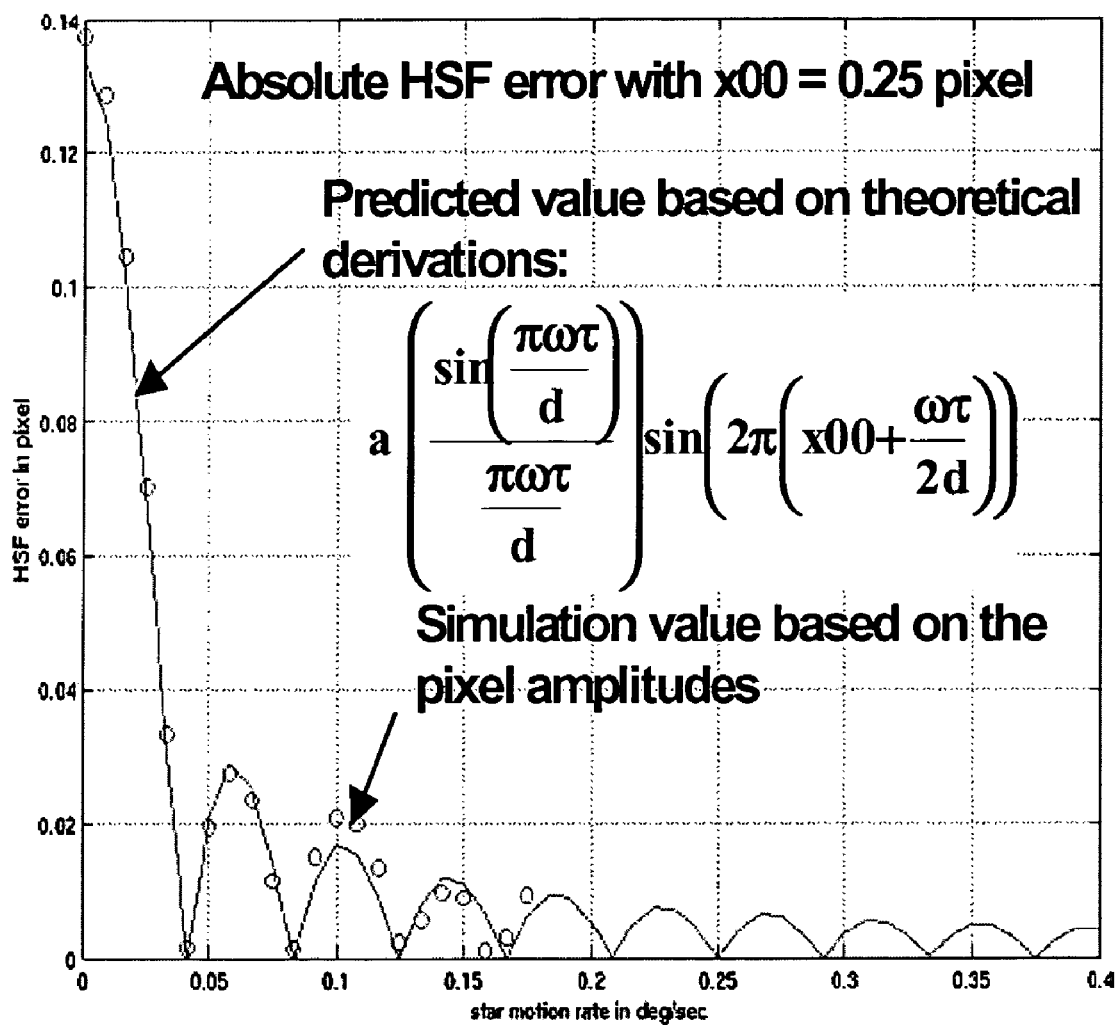
FIG. 14 is a diagram of the resulting systematic centroiding error as a function of time.

FIG. 14 is a diagram showing the resultant HSF error as a function of star motion rate given by Equation (12) or (13), and the actual simulation results based on the centroiding algorithms calculation defined by Equation (9) and Equation (10), which simulates the true pixel amplitudes as star moves across the detectors. Simulation results indicate that Equations (12) or (13) can be used to accurately describe our idea of pixel-frequency slew for minimizing the HSF error.

As shown in FIGS. 10A and 10B, the phasing between the integration time and the motion of the star centroid 804 across the pixel array 800 determines whether there are systematic sinusoidal centroiding errors to be filtered out.

In another embodiment (which can be implemented alone or combined with the second (filtering embodiment) to reduce or change filtering parameters and requirements) is to control the pixel phase φ of the star sensor 218 slew as well as the rate ω of the slewing. This technique is simplest to implement if the star sensor 218 is tracking only one star, since star spacing (and hence, relative phasing) is seldom exactly an integer number of pixels. However as shown in FIGS. 10A and 10B, the centroiding error is still a function of slew pixel phase, as shown below.

A simple example is a slew at 0.5 pixel/integration period (e.g. Plot C of FIG. 10A). By examination of FIG. 6, it is apparent that if the error is integrated over a 0.5 pixel width of the error function, the maximum error occurs when our integration begins at either −0.5 pixels, or 0 pixels. However, if we start out integration at 0.25 pixels, or +0.25 pixels, the error is zero. This result is similarly illustrated in Plots C and D in FIG. 10A. Therefore, the sinusoidal systematic components of the centroiding error can be nulled out by appropriate selection and control of the pixel phase.

This can be accomplished by measuring pixel phase and slewing the sensor accordingly. In cases where the star sensor 218 reports the centroid location directly, the true pixel phase can be determined using techniques described in U.S. Pat. No. 6,566,640. However, many modern trackers internally correct for such factors as optical field distortion and temperature-dependent focal length shift, and these internal corrections may make it difficult to recover the true pixel phase.

In the alternative, a simple way to lock on to the pixel phase is to modify the slew speed by a small amount (e.g., up to ±5%) based on a phase estimate based on the star measurement residuals 313. For example, if the typical star tracker is slewing at 0.5 samples/period, at the maximum error phase, FIG. 6 indicates that each sample will have a 0.08 pixel=4.0 arcsecond error. By differencing the current residual with the prior residual, we will see a nominal difference of 8 arcseconds. This error signal will be corrupted by random temporal noise as well, of about 2.8 arcseconds RMS per sample, or 4 arcseconds RMS on the difference signal. However, by providing the back-differenced residuals to a pixel phase estimator, a pixel phase estimate can be obtained. This phase estimate can be used to slightly modify the slew rate to "catch up to" or "slow down to" the desired pixel phase. This can be implemented as simply as feeding back the back differenced residual signal with a low gain to adjust the commanded slew speed, as shown in FIG. 11. Since, at a slew rate of 0.5 pixel/sample, there are 1024 samples across a 512×512 pixel array, it will be of relatively little concern if it takes a few tens of samples to lock on to the desired phase.

Note that this approach does not work well (and is indeed unnecessary) if the commanded slew is an integral number of pixels per sample, since the integration in the star tracker 218 itself nulls the centroiding error signal (as shown in Plots A, B and E), making it unavailable for determining phase. Similarly, if we use the back-difference signal to steer the pixel phase to null this signal, the systematic centroiding error becomes unobservable.

However, both the temporal noise and the variations in pixel intensity remain observable, and are in fact more observable than usual, since the systematic centroiding error is largely removed. This is a side benefit of all these techniques—by removing the systematic error, it is easier to monitor the remaining residuals to gauge the other error sources.

Also, note that, as a diagnostic tool for measuring in-flight centroiding error, the sign of the back-differenced residuals used to generate the commanded slew rate can be changed, to steer the phase to maximize the systematic phase error. The back-differenced residuals can be telemetered to ground assets to provide a measure of the magnitude of the systematic centroiding error. This operation will have negligible impact on attitude determination accuracy if a suitable filter (such as the [0.25, 0.5, 0.25] three sample filer) is implemented between the star residuals and the attitude determination function, providing second-order insensitivity to this signal). By then changing the feedback back to drive the slew phase to null the systematic centroiding error, the attitude determination function will be third-order insensitive to systematic centroiding error.

With multiple stars in a star tracker, the pixel phase is likely to be different for each, However, pixel-phased slews can still be successfully implemented, by driving the sum of the back-differenced residuals to zero.

The desired angular rate of pixels per integration period may be achieved by controlling the integration period rather than, or in addition to, controlling the angular rate in radians per second at which the star tracker FOV traverse a star. Many CCD star trackers have commandable integration periods which could be autonomously adjusted to keep the angular rates in pixels per integration period along the pixel raws and/or columns at desired rates of n/p and m/p pixels per integration period.

Star trackers based on active pixel sensors (APS) have the further flexibility that pixel readout is random access. APS sensors with multiple stars simultaneously in the field of view, with different pixel/second rates, can be integrated at different times to ensure favorable pixel/integration rates.

Figure 15:
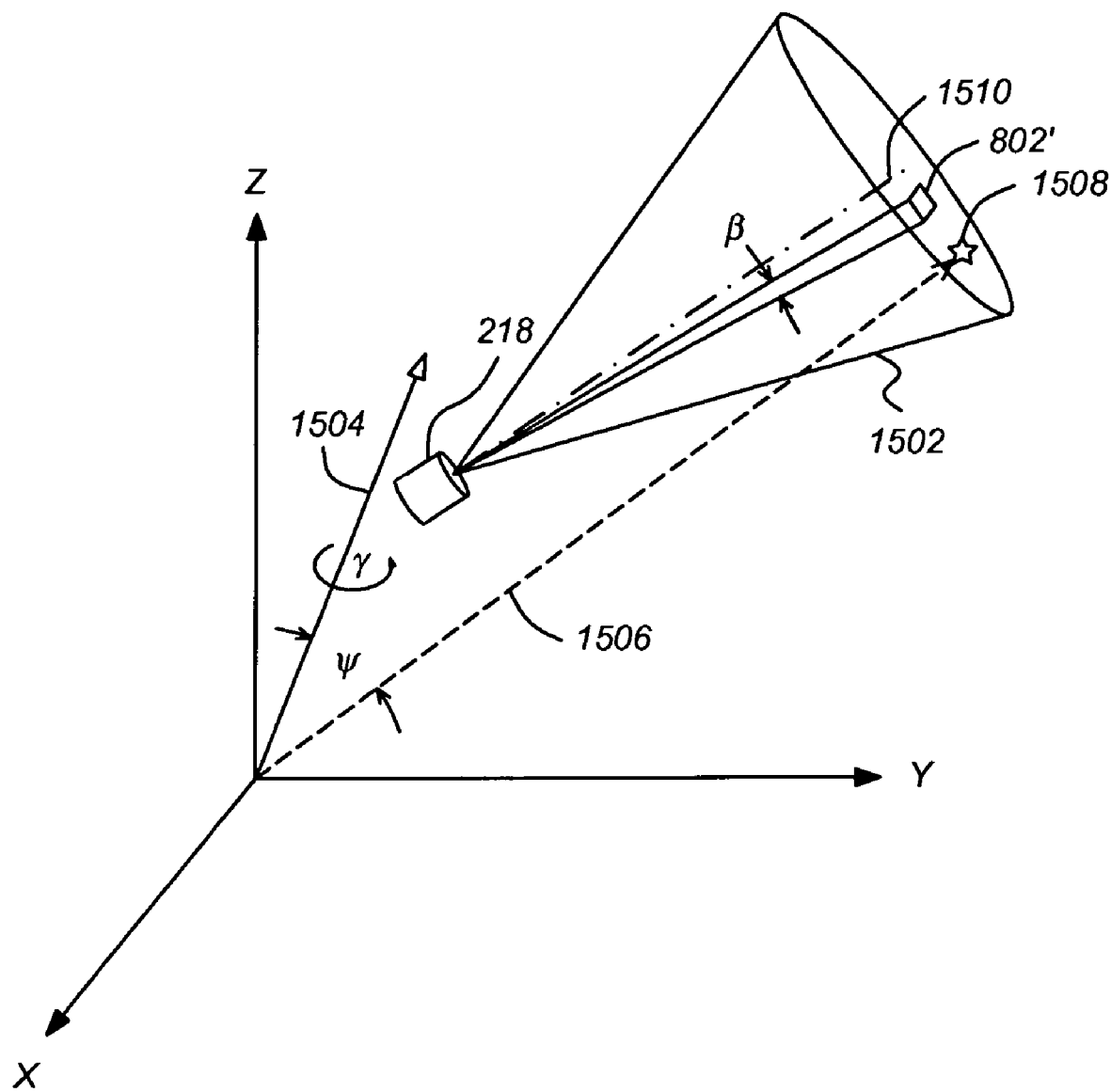
FIG. 15 is a diagram illustrating factors that impact the star sensor angular slew rate of ω pixels per star sensor integration period τ.

In this foregoing discussion, we select a star sensor angular rate of $$\omega = \frac{n}{p}$$

pixels per star integration period τ. For a satellite 100 or star sensor 218 rotating at a particular angular velocity γ 1504 in radians per second, ω is a function of several factors. These factors, which are illustrated in FIG. 15, include the magnitude of γ 1504, the cant angle Ψ between the vector γ 1504 and direction of the star location 1508 in the FOV 1502 of the star tracker 218, and the angular subtense β of the pixel image 802'. Any one of these factors, or combination of these factors, can be used to advantage to achieve a star sensor angular rate of $$\omega = \frac{n}{p}$$

pixels per integration period. For example, geostationary satellites typically rotate at a constant rate of once per day, and the cant angle Ψ between the that rotation vector γ and the boresight 1510 of star tracker 218 is typically a design degree of freedom that could be chosen to achieve a desired star sensor angular rate of $$\omega = \frac{n}{p}$$

pixels per integration period τ. The angular subtense β of the pixel image 802' is also a design parameter, which can be adjusted by selecting a particular focal length of the star tracker 218 optics, or a particular linear dimensions of the image sensor pixels. These design degrees of freedom could be chosen to achieve a desired star sensor angular race of $$\omega = \frac{n}{p\tau}$$

pixels per integration period. It is also noted that the integration period τ itself may be chosen to achieve the desired results.

For star trackers capable of distinct integration periods for each of multiple stars in the field of view, such as active pixel sensor (APS) star trackers, the integration period can be controlled to ensure that $$\omega = \frac{n}{p\tau}$$

for each of the multiple stars, even if the star crossing rates in pixels per second are different for each of the multiple stars.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, while some of the foregoing embodiments been described with respect to a processor performing particular operations, the invention may be practiced with the use of a plurality of processors or with special purpose digital or analog modules.

It is intended that the scope of the invention be limited not by this detailed description, but rather by the claims appended hereto. The above specification, examples and data provided a complete description of the manufacture and use of the composition of the invention. Since many embodiments of the invention can be made without departing from the spirit and scope of the invention, the invention resides in the claims hereinafter appended.

What is claimed is:

1. A method of reducing centroiding error of a star sensor having a plurality of pixels, comprising the steps of:
   computing a star sensor angular slew rate of ω pixels per star sensor integration period τ as $$\omega = \frac{n}{\tau},$$

wherein n is a positive integer; and
   collecting star sensor data while slewing the star sensor according to the selected star sensor angular slew rate ω.

2. The method of claim 1, wherein the star tracker is slewed at a slew angle θ relative to a row of pixels, and wherein:
   the angular slew rate ω in a direction of the row of pixels is selected according to $$\arccos\left(\frac{n}{\tau}\right); \text{ and}$$

the angular slew rate ω in a direction perpendicular to the row of pixels is selected according to $$\arcsin\left(\frac{n}{\tau}\right).$$

3. The method of claim 1, wherein:
   the slew rate ω is selected to produce star sensor data having a temporal frequency component corresponding to a temporal frequency null of a spacecraft attitude control system.

4. The method of claim 1, wherein the step of collecting star sensor data while slewing the star sensor according to the selected star sensor angular slew rate ω comprises the step of controlling a magnitude of a star sensor angular velocity γ in radians per second.

5. The method of claim 1, wherein the step of collecting star sensor data while slewing the star sensor according to the selected star sensor angular slew rate ω comprises the step of controlling a cant angle Ψ between a star sensor angular velocity γ and a direction of a sensed star in a field of view of the star sensor.

6. The method of claim 1, wherein the step of collecting star sensor data while slewing the star sensor according to the selected star sensor angular slew rate ω comprises the step of controlling an integration period τ of the star sensor.

7. The method of claim 6, wherein the integration period τ is time-varying.

8. The method of claim 6, wherein a field of view of the star sensor includes a plurality of stars, and the integration period τ is different for each of the plurality of stars in the star sensor field of view.

9. An apparatus for improving the accuracy of a star sensor having a plurality of pixels, comprising:
a processor; and
a memory, in communication with the processor, the memory storing processor instructions for:
computing a star sensor angular slew rate of ω pixels per star sensor integration period τ as $$\omega = \frac{n}{\tau}$$

wherein n is a positive integer;
collecting star sensor data while slewing the star sensor according to the selected star sensor angular slew rate ω.

10. The apparatus of claim 9, wherein the star sensor is slewed at a slew angle θ relative to a row of pixels, and wherein:
the angular slew rate ω in a direction of the row of pixels is selected according to $$\arccos\left(\frac{n}{\tau}\right); \text{ and}$$

the angular slew rate ω in a direction perpendicular to the row of pixels is selected according to $$\arcsin\left(\frac{n}{\tau}\right).$$

11. The apparatus of claim 10, wherein the memory further stores instructions implementing a spacecraft attitude control system, and wherein:
the processor selects the slew rate ω to produce star sensor data having a temporal frequency matching a temporal frequency null of a spacecraft attitude control system.

12. The apparatus of claim 9, wherein the processor instructions further comprise instructions for collecting star sensor data while slewing the star sensor according to the selected star sensor angular slew rate ω comprises the step of controlling a magnitude of a star sensor angular velocity γ in radians per second.

13. The apparatus of claim 9, wherein the processor instructions further comprise instructions for collecting star sensor data while slewing the star sensor according to the selected star sensor angular slew rate ω comprises the step of controlling a cant angle Ψ between a star sensor angular velocity γ and a direction of a sensed star in a field of view of the star sensor.

14. The apparatus of claim 9, wherein the processor instructions further comprise instructions for collecting star sensor data while slewing the star sensor according to the selected star sensor angular slew rate ω comprises the step of controlling an integration period τ of the star sensor.

15. The apparatus of claim 14, wherein the integration period τ is time-varying.

16. The apparatus of claim 14, wherein a field of view of the star sensor includes a plurality of stars, and the integration period τ is different for each of the plurality of stars in the star sensor field of view.

17. An apparatus for reducing centroiding error of a star sensor having a plurality of pixels, comprising:
means for computing a star sensor angular slew rate of ω pixels per star sensor integration period τ as $$\omega = \frac{n}{\tau},$$

wherein n is a positive integer; and
means for collecting star sensor data while slewing the star sensor according to the selected star sensor angular slew rate ω.

18. The apparatus of claim 17, wherein the star sensor is slewed at a slew angle θ relative to a row of pixels, and wherein:
the angular slew rate ω in a direction of the row of pixels is selected according to $$\arccos\left(\frac{n}{\tau}\right); \text{ and}$$

the angular slew rate ω in a direction perpendicular to the row of pixels is selected according to $$\arcsin\left(\frac{n}{\tau}\right).$$

19. The apparatus of claim 17, wherein:
the slew rate ω is selected to produce star sensor data having a temporal frequency component corresponding to a temporal frequency null of a spacecraft attitude control system.

20. The apparatus of claim 17, wherein the means for collecting star sensor data while slewing the star sensor according to the selected star sensor angular slew rate ω comprises means for controlling a magnitude of a star sensor angular velocity γ in radians per second.

21. The apparatus of claim 17, wherein the means for collecting star sensor data while slewing the star sensor according to the selected star sensor angular slew rate ω comprises means for controlling a cant angle Ψ between a star sensor angular velocity γ and a direction of a sensed star in a field of view of the star sensor.

22. The apparatus of claim 17, wherein the means for collecting star sensor data while slewing the star sensor according to the selected star sensor angular slew rate ω comprises means for controlling an integration period τ of the star sensor.

23. The apparatus of claim 22, wherein the integration period τ is time-varying.

24. The apparatus of claim 22, wherein a field of view of the star sensor includes a plurality of stars, and the integration period τ is different for each of the plurality of stars in the star sensor field of view.

25. A method of reducing centroiding error of a star sensor having a plurality of pixels, comprising the steps of:
comprising a star sensor angular slew rate of ω pixels per star sensor integration period τ as $$\omega = \frac{n}{p\tau},$$

wherein n and p are positive integers and p≧2; and
collecting star sensor data while slewing the star sensor according to the selected star sensor angular slew rate ω.

26. The method of claim 25, wherein:
the slew rate ω is selected to produce star sensor data having a temporal frequency component corresponding to a temporal frequency null of a spacecraft attitude control system.

27. The method of claim 25, further comprising the step of:
if the collected star sensor data includes a temporal frequency component, filtering the collected star sensor data according to a frequency determined by the selected star sensor angular slew rate ω.

28. The method of claim 27, wherein the step of filtering the collected star sensor data comprises notch filtering the collected star sensor data according to a notch frequency determined by the selected star sensor angular slew rate ω.

29. The method of claim 27, wherein the step of filtering the collected star data comprises the step of computing a κ-point moving average of the collected star data, wherein k≧p.

30. The method of claim 29, further comprising the step of:
determining a pixel phase of the star sensor data; and
controlling the star sensor angular slew rate ω according to the pixel phase.

31. The method of claim 30, wherein the step of determining the pixel phase of the star data comprises the step of:
determining the pixel phase from a difference between a first residual error value with a second residual error value.

32. The method of claim 25, wherein the step of collecting star sensor data while slewing the star sensor according to the selected star sensor angular slew rate ω comprises the step of controlling a magnitude of a star sensor angular velocity γ in radians per second.

33. The method of claim 25, wherein the step of collecting star sensor data while slewing the star sensor according to the selected star sensor angular slew rate ω comprises the step of controlling a cant angle Ψ between a star sensor angular velocity γ and a direction of a sensed star in a field of view of the star sensor.

34. The method of claim 25, wherein the step of collecting star sensor data while slewing the star sensor according to the selected star sensor angular slew rate ω comprises the step of controlling an integration period τ of the star sensor.

35. The method of claim 34, wherein the integration period τ is time-varying.

36. The method of claim 34, wherein a field of view of the star sensor includes a plurality of stars, and the integration period τ is different for each of the plurality of stars in the star sensor field of view.

37. The method of claim 25, wherein p=2.

38. The method of claim 25, wherein p≦4.

39. The method of claim 25, wherein p≦10.

40. An apparatus for improving the accuracy of a star sensor having a plurality of pixels, comprising:
a processor; and
a memory, in communication with the processor, the memory storing processor instructions comprising instructions for:
computing a star sensor angular slew rate of ω pixels per star sensor integration period τ as $$\omega = \frac{n}{p\tau},$$

wherein n and p are positive integers and p≧2;
collecting star sensor data while slewing the star sensor according to the selected star sensor angular slew rate ω.

41. The apparatus of claim 40, wherein the slew rate ω is selected to produce star sensor data having a temporal frequency component corresponding to a temporal frequency null of a spacecraft attitude control system.

42. The apparatus of claim 40, wherein the memory further stores processor instructions comprising instructions for filtering the collected star sensor data according to a frequency determined by the selected star sensor angular slew rate ω if the collected sensor data includes a temporal frequency component.

43. The apparatus of claim 42, wherein the processor filters the collected star data by comprising a κ-point moving average of the collected star data, wherein k≧p.

44. The apparatus of claim 43, wherein the processor further comprises instructions for:
determining a pixel phase of the star sensor data; and
controlling the star sensor angular slew rate ω according to the pixel phase.

45. The apparatus of claim 44, wherein the processor determines the pixel phase of the star data by determining the pixel phase from a difference between a first residual error value with a second residual error value.

46. The apparatus of claim 40, wherein the star sensor is slewed at a slew angle θ relative to a row of pixels, and wherein:
the processor selects the angular slew rate ω in a direction of the row of pixels according to $$\arccos\left(\frac{n}{\tau}\right); \text{ and}$$

the processor selects the angular slew rate ω in a direction perpendicular to the row of pixel according to $$\arcsin\left(\frac{n}{\tau}\right).$$

47. The apparatus of claim 40, wherein the processor instructions further comprise instructions for collecting star sensor data while slewing the star sensor according to the selected star sensor angular slew rate ω comprises the step of controlling a magnitude of a star sensor angular velocity γ in radians per second.

48. The apparatus of claim 40, wherein the processor instructions further comprise instructions for collecting star sensor data while slewing the star sensor according to the selected star sensor angular slew rate ω comprises the step of controlling a cant angle Ψ between a star sensor angular velocity γ and a direction of a sensed star in a field of view of the star sensor.

49. The apparatus of claim 40, wherein the processor instructions further comprise instructions for collecting star sensor data while slewing the star sensor according to the selected star sensor angular slew rate ω comprises the step of controlling an integration period τ of the star sensor.

50. The apparatus of claim 49, wherein the integration period τ is time-varying.

51. The apparatus of claim 49, wherein a field of view of the star sensor includes a plurality of stars, and the integration period τ is different for each of the plurality of stars in the star sensor field of view.

52. An apparatus for reducing centroiding error of a star sensor having a plurality of pixels, comprising:
means for computing a star sensor angular slew rate of ω pixels per star sensor integration period τ as $$\omega = \frac{n}{p\tau},$$

wherein n and p are positive integers and p≧2; and
means for collecting the star sensor data while slewing the star sensor according to the selected star sensor angular slew rate ω.

53. The apparatus of claim 52, wherein:
the slew rate ω is selected to produce star sensor data having a temporal frequency component corresponding to a temporal frequency null of a spacecraft attitude control system.

54. The apparatus of claim 52, further comprising the step of:
means for filtering the collected star sensor data according to a frequency determined by the selected star sensor angular slew rate ω if the collected star sensor data includes a temporal frequency component.

55. The apparatus of claim 54, wherein the means for filtering the collected star sensor data comprises notch filtering the collected star sensor data according to a notch frequency determined by the selected star sensor angular slew rate ω.

56. The apparatus of claim 54, wherein the means for filtering the collected star data comprises means for computing a κ-point moving average of the collected star data, wherein κ≧p.

57. The apparatus of claim 54, further comprising:
means for determining a pixel phase of the star sensor data; and
means for controlling the star sensor angular slew rate ω according to the pixel phase.

58. The apparatus of claim 57, wherein the means for determining the pixel phase of the star data comprises:
means for determining the pixel phase from a difference between a first residual error value with a second residual error value.

59. The apparatus of claim 52, wherein the means for collecting star sensor data while slewing the star sensor according to the selected star sensor angular slew rate ω comprises means for controlling a magnitude of a star sensor angular velocity γ in radians per second.

60. The apparatus of claim 52, wherein the means for collecting star sensor data while slewing the star sensor according to the selected star sensor angular slew rate ω comprises means for controlling a cant angle Ψ between a star sensor angular velocity γ and a direction of a sensed star in a field of view of the star sensor.

61. The apparatus of claim 52, wherein the means for collecting star sensor data while slewing the star sensor according to the selected star sensor angular slew rate ω comprises means for controlling an integration period τ of the star sensor.

62. The apparatus of claim 61, wherein the integration period τ is time-varying.

63. The apparatus of claim 61, wherein a field of view of the star sensor includes a plurality of stars, and the integration period τ is different for each of the plurality of stars in the star sensor field of view.

* * * * *